(12) United States Patent
Marsh et al.

(10) Patent No.: US 10,182,307 B2
(45) Date of Patent: Jan. 15, 2019

(54) SYSTEM FOR PROVIDING LOCATION-BASED SOCIAL NETWORKING SERVICES TO USERS OF MOBILE DEVICES

(71) Applicant: Geospock Limited, Cambridge (GB)

(72) Inventors: Steven Joseph Thomas Marsh, Cambridge (GB); Kai Darren Van Duuren Lane, Cambridge (GB); Rory Marquis, Cambridge (GB); Michael David Pedersen, Cambridge (GB)

(73) Assignee: Geospock Limited (GB)

( * ) Notice: Subject to any disclaimer, the term of this patent is extended or adjusted under 35 U.S.C. 154(b) by 178 days.

(21) Appl. No.: 15/315,665

(22) PCT Filed: Jun. 2, 2015

(86) PCT No.: PCT/GB2015/051609
§ 371 (c)(1),
(2) Date: Dec. 1, 2016

(87) PCT Pub. No.: WO2015/185919
PCT Pub. Date: Dec. 10, 2015

(65) Prior Publication Data
US 2017/0188187 A1    Jun. 29, 2017

(30) Foreign Application Priority Data

Jun. 2, 2014  (GB) .................................. 1409787.7
Jun. 2, 2014  (GB) .................................. 1409789.3
Jun. 2, 2014  (GB) .................................. 1409790.1

(51) Int. Cl.
*H04W 4/02*   (2018.01)
*H04W 4/80*   (2018.01)
(Continued)

(52) U.S. Cl.
CPC ............. *H04W 4/02* (2013.01); *G01S 5/0236* (2013.01); *G01S 5/0263* (2013.01);
(Continued)

(58) Field of Classification Search
CPC ...................................................... H04W 4/02
(Continued)

(56) References Cited

U.S. PATENT DOCUMENTS

2003/0125046 A1  7/2003  Riley
2011/0176523 A1  7/2011  Huang
(Continued)

FOREIGN PATENT DOCUMENTS

WO  2012035190 A1  3/2012
WO  2013108043 A2  7/2013

OTHER PUBLICATIONS

International Search Report dated Oct. 28, 2015, International Application No. PCT/GB2015/051609, 6 pages.

*Primary Examiner* — Michael T Vu
(74) *Attorney, Agent, or Firm* — Ware, Fressola, Maguire & Barber LLP

(57) ABSTRACT

A system (1) includes a plurality of mobile devices ($2_1 \ldots 2_N$) connectable to a server system (3) via a network system (4), one or more computing devices (5) connectable to the server system (3). The system (1) also includes a global navigation satellite system (36) and a plurality of transmitters ($37_1 \ldots 37_{N'}$). For example, the system can be for providing location-based and/or social networking services to users of the mobile devices ($2_1 \ldots 2_N$). Improvements in aspects of the underlying technology are described.

11 Claims, 15 Drawing Sheets

(51) Int. Cl.
  *H04L 29/08* (2006.01)
  *H04W 4/18* (2009.01)
  *G01S 5/02* (2010.01)
  *H04W 4/21* (2018.01)
  *H04W 4/029* (2018.01)

(52) U.S. Cl.
  CPC ......... *H04L 67/1095* (2013.01); *H04W 4/023* (2013.01); *H04W 4/18* (2013.01); *H04W 4/185* (2013.01); *H04W 4/21* (2018.02); *H04W 4/80* (2018.02); *H04W 4/027* (2013.01); *H04W 4/029* (2018.02)

(58) Field of Classification Search
  USPC ............................................ 455/456.1–456.6
  See application file for complete search history.

(56) References Cited

U.S. PATENT DOCUMENTS

| | | |
|---|---|---|
| 2011/0201348 A1 | 8/2011 | Murray |
| 2012/0166347 A1 | 6/2012 | Lacal |
| 2013/0097163 A1* | 4/2013 | Oikarinen ......... G06F 17/30241 707/736 |
| 2013/0267242 A1 | 10/2013 | Curticapean |
| 2014/0274154 A1* | 9/2014 | Rana .................. G06Q 30/0282 455/456.3 |
| 2015/0264523 A1* | 9/2015 | Xu ........................ H04W 4/021 455/456.3 |

\* cited by examiner

SYSTEM FOR PROVIDING LOCATION-BASED SOCIAL NETWORKING SERVICES TO USERS OF MOBILE DEVICES

FIELD

The present invention relates to aspects of a system, particularly a location-based social networking system.

BACKGROUND

There is considerable interest in systems for providing location-based and/or social networking services to users of mobile devices. The present invention relates to improvements in aspects of the underlying technology and seeks to provide an improved such system.

SUMMARY

According to a first aspect of the present invention, there is provided a method of operating a device having a local data structure for storing data obtained from a global data structure specifying the locations of wireless transmitters, the method comprising:
 receiving wireless transmissions, each wireless transmission including data identifying a wireless transmitter; and
 determining if the local data structure includes data specifying the location of a wireless transmitter as identified in one or more of the wireless transmissions that is consistent with data specifying the location of the device; and
 if not, sending data specifying the location of the wireless transmitter to a server system to be added to and/or used to modify the global data structure, the data specifying the location of the wireless transmitter determined using data specifying the location of the device.

Thus, the method can provide an effective and efficient way for a set of devices to update a global data structure from which wireless transmitter location data is obtained by the devices. For example, suitable data can be provided to suitable data structures at suitable times while minimising data communications and processing requirements.

According to a second aspect of the present invention, there is provided a method of operating a device having a local data structure for storing data obtained from a global data structure specifying the locations of wireless transmitters, the method comprising:
 receiving wireless transmissions, each wireless transmission including data identifying a wireless transmitter;
 determining if the local data structure includes data specifying the location of a wireless transmitter as identified in one or more of the wireless transmissions that is consistent with data specifying the location of the device;
 obtaining data specifying the location of the wireless transmitter from the global data structure and storing the data in the local data structure if the determination is negative; and
 updating data specifying the location of the device using the data in the local data structure specifying the location of the wireless transmitter.

Thus, the method can provide a robust and efficient way for devices to update their location data. For example, a suitable update can be performed, while data communications between the device and a server system, and data processing by the server system, can be minimised.

According to a third aspect of the present invention, there is provided a method of operating a server system, the method comprising:
 receiving a plurality of sets of data from one or more devices, each set of data comprising identifying data identifying a wireless transmitter, and data specifying the location of the wireless transmitter and an accuracy of the specified location;
 determining a location of the wireless transmitter and an accuracy of the determined location using the data specifying the location of the wireless transmitter and the accuracy of the specified location in two or more of the sets of data;
 in response to a request, sending data specifying the determined location of the wireless transmitter and the accuracy of the determined location to a device having a local data structure for storing the data.

Thus, the server system can provide services to enable devices to operate in accordance with the first and second aspects of the present invention.

According to a fourth aspect of the present invention, there is provided a method of operating a server, the method comprising:
 receiving a request for data associated with a particular number of elements in a vicinity of a location;
 simultaneously searching a data structure for a plurality of geohashes at a first level to find a first set of a first number of elements;
 selectively simultaneously searching the data structure for a plurality of geohashes at a second level to find a second set of a second number of elements, wherein the second level is determined based upon a comparison between the first number and the particular number; and
 providing a response including data associated with the first set of elements and, if found, the second set of elements.

Thus, the method can provide a faster way of searching for a number of elements in a vicinity of a location.

According to a fifth aspect of the present invention, there is provided a method of operating a device, the method comprising:
 sending, to a server system, a request for data relating to a particular number of elements in a vicinity of a location of the device;
 receiving a response comprising data relating to a set of elements, the data comprising data specifying a location associated with each of the elements;
 causing a user interface to provide an output representing data related to one or more of the elements, wherein the configuration of the output is dependent upon the location of the elements relative to the location of the device; and
 in response to a change in the location of the device, updating the output using the data in the response.

Thus, the method can provide an effective and efficient way of obtaining and outputting information about the location of elements in a vicinity of a location. For example, a suitable output can be provided while minimising data communications.

According to a sixth aspect of the present invention, there is provided a method of operating a device, the method comprising:
 receiving data and an identifier of a structure of a database for storing the data and/or of a configuration of a user interface for inputting/outputting data to/from the database; and if the received identifier is different from an identifier associated with the device:
obtaining information relating to the structure of the database for storing the data and/or the configuration of the user interface for inputting/outputting data to/from the database;
selectively restructuring the local database according to the information;
storing the data in the local database; and
selectively providing a user interface for inputting/outputting data to/from the local database configured according to the information.

Thus, the method can provide a robust and efficient way for devices to receive, store and input/output data, wherein the data may require storing in a local database with a different structure or may require inputting/outputting via a different user interface. Moreover, this can enable other elements, e.g. a server system, to provide data to the devices without prior knowledge of the local data structures of the devices, e.g. without having to know that each of the devices has been updated in a particular way.

According to a seventh aspect of the present invention, there is provided a method of operating a server system, the method comprising:
providing a user interface for restructuring a global database, for restructuring a local database for storing data obtained from the global database and/or for reconfiguring a user interface for inputting/outputting data to/from the local database;
sending data obtained from the global database and an identifier of the structure of the local database and/or of the configuration of the user interface; and
in response to a request, sending information relating to the structure of the restructured local database and/or the configuration of the reconfigured user interface.

Thus, the server system can enable a global database to be restructured and a user interface to be reconfigured while providing services to enable devices to operate in accordance with the sixth aspects of the present invention.

According to each of several further aspects of the present invention, there is provided apparatus configured to perform a method according to any one of the first to seventh aspects of the present invention.

Optional features are specified in the dependent claims.
Further advantages are described below.

BRIEF DESCRIPTION OF THE DRAWINGS

Certain embodiments of the present invention will now be described, by way of example only, with reference to the accompanying drawings in which.

DETAILED DESCRIPTION OF THE CERTAIN EMBODIMENTS

System

Figure 1:
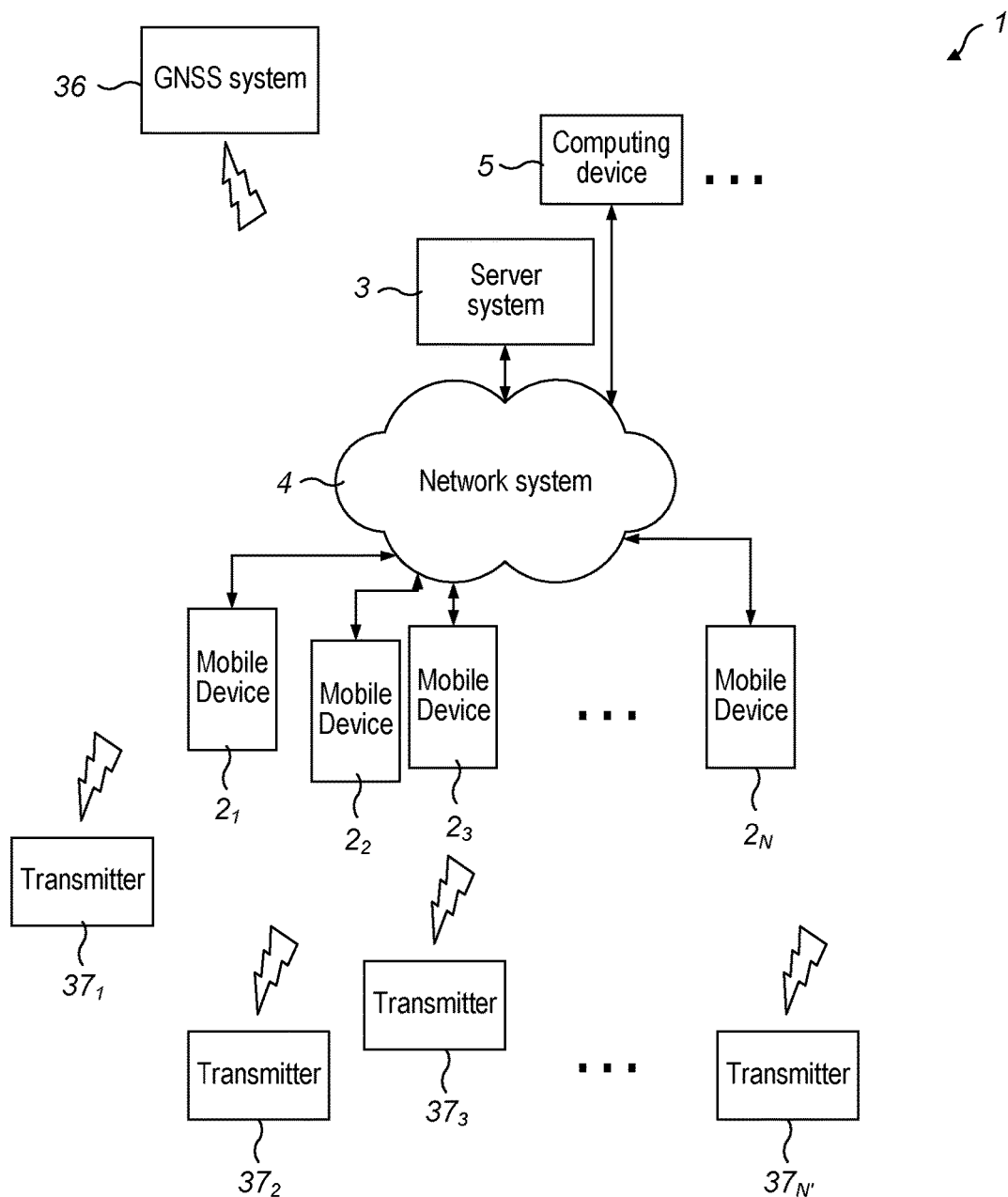
FIG. 1 illustrates a system.

Referring to FIG. 1, a system 1 will now be described.
The system 1 includes a plurality of mobile devices $2_1 \ldots 2_N$ connectable to a server system 3 via a network system 4. The system 1 also includes one or more computing devices 5 connectable to the server system 3 via the network system 4. The system 1 also includes a global navigation satellite system (GNSS) 36. The system 1 also includes a plurality of transmitters $37_1 \ldots 37_{N'}$, which may include one or more wireless access points (which may be part of the network system 4), one or more iBeacon transmitters, etc.

As will be explained in more detail below, the system 1 can enable one or more services (hereinafter referred to as relevant services) to be provided to users (hereinafter referred to as mobile users) of the mobile devices $2_1 \ldots 2_N$. An example of a relevant service is a location-based social networking service. Furthermore, the system 1 can serve as a technology platform to enable users (hereinafter referred to as developers) of the computing devices 5 to create software applications 15 (FIG. 2) (hereinafter referred to as compatible applications). A compatible application 15 can cause the mobile device 2 to cooperate with other elements of the system 1 to provide a relevant service to a mobile user.

Mobile Devices

Figure 2:
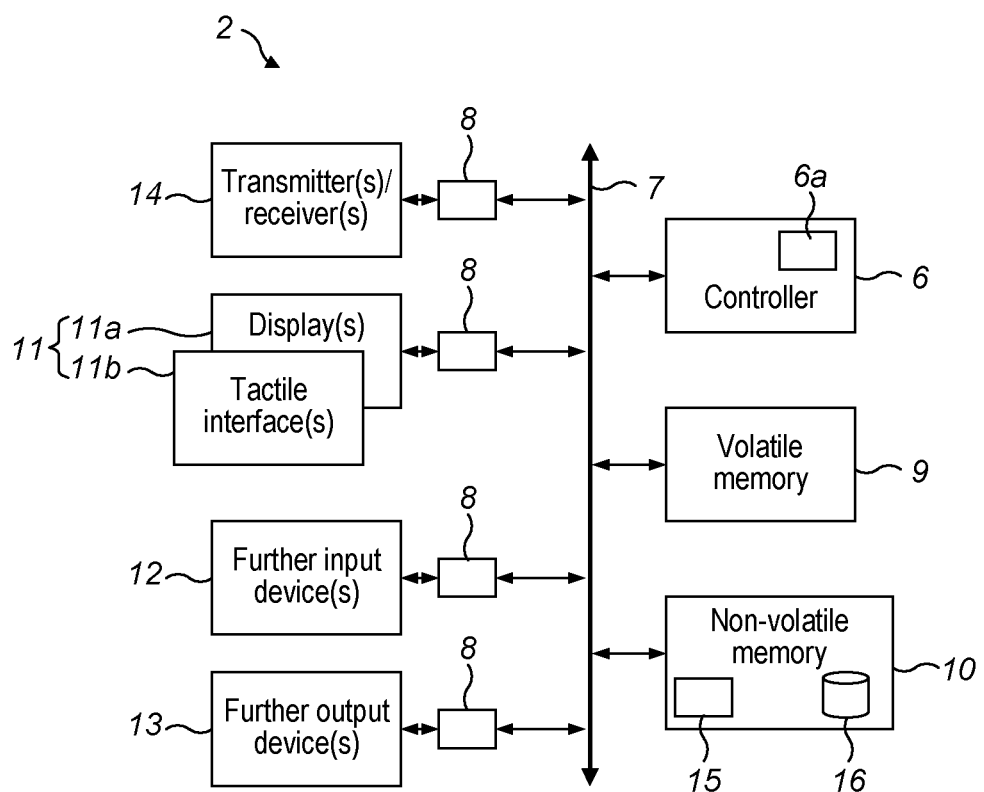
FIG. 2 illustrates a mobile device included in the system of FIG. 1.

Referring to FIG. 2, a mobile device 2 will now be described in more detail.
The mobile device 2 preferably corresponds to a mobile telephone or a mobile computing device.

The mobile device 2 includes a controller 6 comprising at least one processor 6a. The controller 6 communicates with other elements of the mobile device 2 via a system bus 7, either directly or via an interface (generally denoted by the numeral 8). These other elements preferably include volatile memory 9, non-volatile (or non-transitory) memory 10, a touchscreen 11, one or more further input devices 12, one or more further output devices 13, and one or more transmitters/receivers 14.

The volatile memory 9 may include random-access memory, dynamic random-access memory, etc. The volatile memory 9 is used by the controller 6 for temporary data storage, e.g. when controlling operation of another component of the mobile device 2 or when moving data between components of the mobile device 2.

The non-volatile memory 10 may include read-only memory, flash memory, etc. The non-volatile memory 10 stores computer-readable instructions. The computer-readable instructions include system software and application software. The application software includes at least one compatible application 15. When executed by the controller 6, a compatible application 15 (together with e.g. one or more elements of the system software) causes the mobile device 2 to perform methods described herein. The non-volatile memory 10 also stores data for use by the mobile device 2. These data include at least one data structure 16 (hereinafter referred to as a local database) which includes data for use by at least one compatible application 15.

The touchscreen 11 includes a display part 11a and a tactile interface part 11b. The controller 6 receives inputs from the tactile interface part 11b and controls a display shown on the display part 11a. The further input devices 12 preferably include one or more physical keys, microphones and sensors (e.g. an accelerometer, magnetometer, gyroscopic sensor), etc. The further output devices 13 preferably include one or more speakers, light-emitting diodes, vibrating devices, etc. These elements, together with certain elements of the system software and application software, provide a user interface (hereinafter referred to as the mobile user interface) for the mobile user.

The transmitters/receivers 14 include one or more elements configured to communicate over one or more different types of wireless communications links. These wireless communications links include, for example, mobile (or, in other words, cellular) communications links (e.g. $2^{nd}$, $3^{rd}$ or $4^{th}$ generation mobile communication links) and/or other types of wireless communications links (e.g. Wi-Fi links). Hence, for example, the mobile device 2 is able to communicate with the server system 3 via the network system 4. The transmitters/receivers 14 preferably include a GNSS receiver, e.g. a Global Positioning System (GPS) receiver. Hence the mobile device 2 is able to receive signals from the GNSS system 36 and determine data (hereinafter referred to as satellite location data) about the location of the mobile device 2.

The mobile device 2 may also include further components (not shown) such as a battery, a connector, etc.

Each mobile device 2 is preferably the same as, or similar to, the mobile device 2 described above.

Server System

Figure 3:
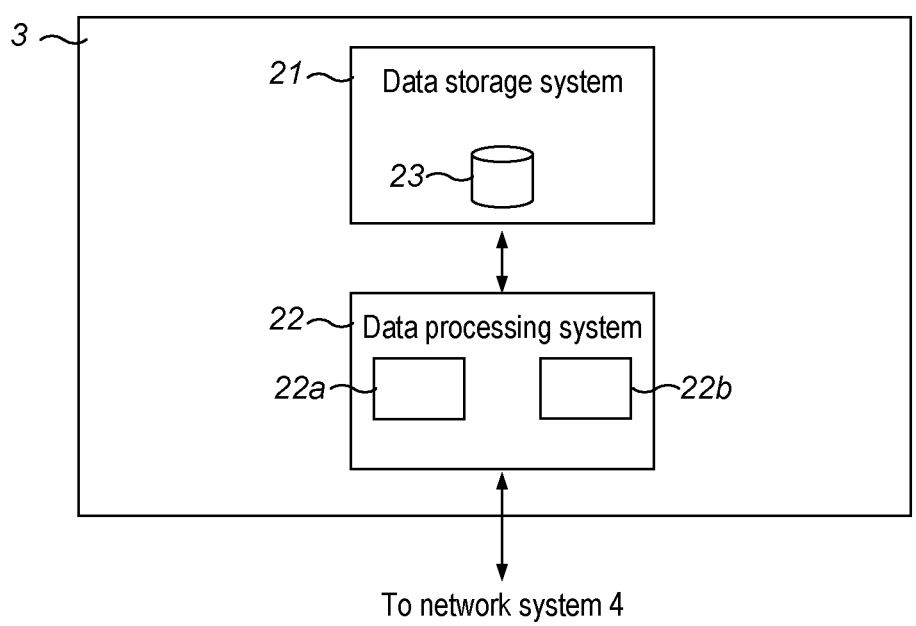
FIG. 3 illustrates a server system included in the system of FIG. 1.

Referring to FIG. 3, the server system 3 will now be described in more detail.

The server system 3 includes a data storage system 21 and a data processing system 22.

The server system 3 preferably corresponds to a cloud computing system. The server system 3 preferably includes a plurality of computing systems (not shown). The computing systems are interconnected by a network system (not shown). Each of the computing systems preferably includes one or more processors, volatile and non-volatile memory, one or more network interfaces, etc. The non-volatile memory stores computer-readable instructions. When executed, the computer-readable instructions cause the computing systems to cooperate with one another to provide functions of the data storage system 21 and the data processing system 22 described herein.

The data storage system 21 is configured to store data for use in the system 1. In particular, the data storage system 21 is configured to store at least one data structure 23 (hereinafter referred to as a global database) which includes data for use by at least one compatible application 15. As will be explained in more detail below, these data preferably include data about elements such as other mobile users which may be output via the mobile user interface. These data also preferably include data about locations of transmitters, which may be used by a mobile device 2 to update its location. These two different types of data are preferably stored in separate global databases, which may have different data structures. However, for ease of reference, both of these types of data will be described as being stored in the global database 23.

The data processing system 22 includes a subsystem 22a (hereinafter referred to as a mobile devices subsystem) which is configured to provide various services to the mobile devices $2_1 \ldots 2_N$. For example, the mobile devices subsystem 22a is configured to enable a mobile device 2 to transfer data to and/or from the global database 23.

The data processing system 22 also includes a subsystem 22b (hereinafter referred to as a developer subsystem) which is configured to provide various services to the computing devices 5. The developer subsystem 22b is preferably configured to cooperate with each computing device 5 to provide a user interface (hereinafter referred to as a developer interface) for a developer. The developer interface is preferably a web-based user interface. The developer interface is configured to enable a developer to perform methods described herein.

In other examples, the server system 3 may correspond to a different type of server.

Network System

Referring to FIG. 1, the network system 4 will now be described in more detail.

The network system 4 preferably includes a plurality of interconnected networks including one or more mobile/cellular data networks (e.g. $2^{nd}$, $3^{rd}$ and/or $4^{th}$ generation networks), one or more wireless local area networks (e.g. Wi-Fi networks) and the Internet. Each of the mobile devices $2_1 \ldots 2_N$ is connectable to the server system 3 by a respective set of the networks in the network system 4. The computing devices 5 are preferably connectable to the server system 3 in a similar way.

The network system 4 is configured to enable each mobile device 2 to send messages described herein to the server system 3, and to enable the server system 3 to send messages described herein to the mobile device 2.

The network system 4 is also preferably configured to enable the server system 3 to communicate with each computing device 5 in order to provide the developer interface.

Systems with Several Compatible Applications Etc.

In the examples described below, reference will be made to one ('the') compatible application 15, one ('the') local database 16 and one ('the') global database 23. In other examples in which there are several compatible applications 15, local databases 16 and/or global databases 23, there may be additional features as appropriate. For example, each compatible application 15 may have an associated local database 16. Each compatible application 15 may have an associated global database 23 or a part of a global database 23, which is preferably protected (e.g. sandboxed) from other such parts. Messages sent between mobile devices $2_1 \ldots 2_N$ and the server system 3 preferably include data (e.g. a token) identifying the compatible application 15 with which the messages are associated.

First Set of Methods

A set of methods (hereinafter referred to as the first set of methods) which can be performed by components of the system 1 will now be described.

The first set of methods include a method 100 (hereinafter referred to as the first method) performed by a mobile device 2 when running the compatible application 15.

Figure 4:
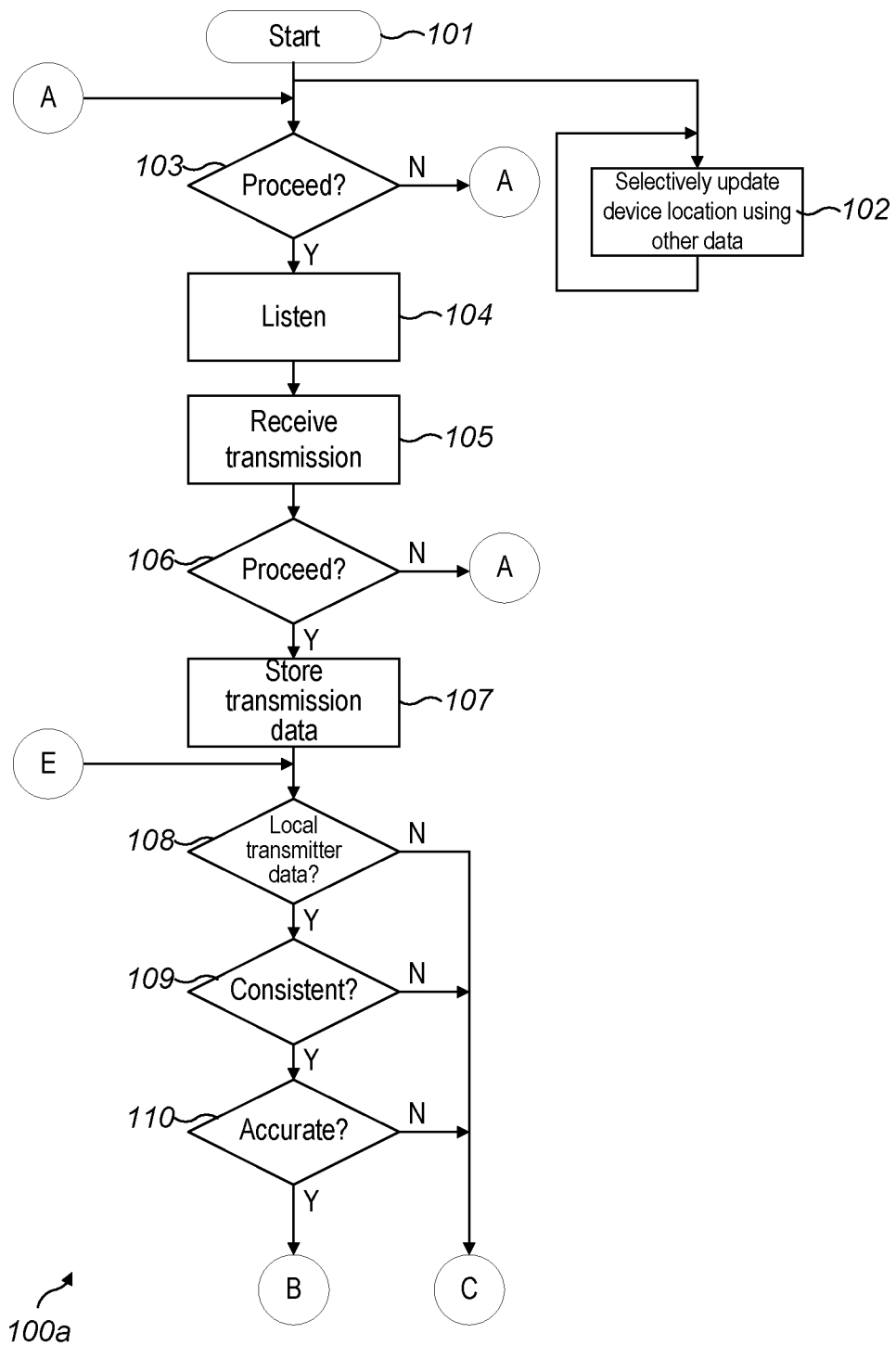
FIG. 4 illustrates a part of a method which can be performed by a mobile device included in the system of FIG. 1.

Referring to FIG. 4, a first part 100a of the first method 100 will now be described.

At a first step 101, the first method 100 starts. The first method 100 may be started whenever the compatible application 15 is run or may be started in any other suitable way, e.g. by another part of the compatible application 15, in response to a user input, etc. The first method 100 may continue while the compatible application 15 is running (in the background/foreground) or may be stopped in any other suitable way.

During the first method (at a second step 102), the mobile device 2 repeatedly selectively updates data (hereinafter referred to as device location data) specifying the location of the mobile device 2 and the accuracy of this location. The mobile device 2 stores the current device location data and also preferably stores the previous device location data. The location of the mobile device 2 is preferably specified as a latitude value and a longitude value.

The mobile device 2 can update the device location data using one or more of several types of data.

For example, the mobile device 2 can update the device location data by a method which is commonly described as cell tower triangulation and which uses transmissions received from a plurality of mobile network base stations (not shown). The mobile device 2 can also update the device location data using data provided by one or more sensors (e.g. the accelerometer, etc.) included in the mobile device 2. These two methods are generally relatively low cost in that, for example, they use relatively little additional energy. However, the accuracy obtained using the methods is generally relatively low.

The mobile device 2 can also update the current device location by activating the GNSS receiver and obtaining and using satellite location data. The accuracy obtained using this method is generally relatively high. However, the method is relatively high cost, for example in relation to energy usage. Hence the method is used relatively rarely to update the device location data, e.g. in a situation in which none of the other types of data can be used and there is a need to update the device location data.

As will be explained in more detail below, at a thirteenth step 113, the mobile device 2 can update the device location data by receiving a wireless transmission from a transmitter 37 with a known location. Such an update is hereinafter referred to as a transmitter-based location update.

At a third step 103, the mobile device 2 determines if the first method 100 is to proceed. This preferably involves determining if the device location data (and/or parameters determined therefrom) meet one or more predetermined criteria. The criteria are such that they are met if the mobile device 2 is moving such that it is likely to be able to make use of wireless transmissions. The mobile device 2 may be configured to determine a current speed of the mobile device 2 and determine if this is below a suitable predetermined speed. The predetermined speed may be of the order of tens of miles per hour. The predetermined speed may depend upon, for example, properties of the mobile device 2. The mobile device 2 may be configured to determine if the time spent by the mobile device 2 in a region with a suitable predetermined size (of the order of tens or hundreds of meters) is above a suitable predetermined time (of the order of seconds or minutes). If the one or more criteria are met, then the first method 100 proceeds to a fourth step 104. If not, then the third step 103 is repeated.

At the fourth step 104, the mobile device 2 listens for wireless transmissions of one or more predetermined types (hereinafter referred to as transmissions). One type of transmission preferably corresponds to IEEE 802.11x (i.e. Wi-Fi) transmissions by a wireless access point 37. These transmissions preferably correspond to beacon frames. Another type of transmission preferably corresponds to Bluetooth low energy iBeacon transmissions by a suitable iBeacon transmitter 37. However, the transmissions may be of other, suitable types. Each transmission includes data (hereinafter referred to as a transmitter identifier) identifying the transmitter 37. In the case of Wi-Fi, the transmitter identifier preferably corresponds to the service set identifier associated with a wireless local area network and/or the physical address (i.e. media access control address) of the wireless access point 37. In the case of iBeacon, the transmitter identifier preferably corresponds to the universally unique identifier of the iBeacon transmitter 37.

At a fifth step 105, the mobile device 2 receives a transmission from a particular transmitter 37 (hereinafter referred to as the transmitter). This may involve sub-steps (not shown) performed by other software running on the mobile device 2.

At a sixth step 106, the mobile device 2 determines if the first method 100 is to proceed in relation to the received transmission. This step may involve determining if the (straight-line) distance between the current location of the mobile device 2 and the location at which the mobile device 2 last received a transmission from the transmitter 37 is above a suitable predetermined distance. The step may involve determining if the time since the mobile device 2 last received a transmission from the transmitter 37 is above a suitable predetermined time. If appropriate, then the first method 100 proceeds to a seventh step 107. If not, then the first method 100 returns to the third step 103.

At the seventh step 107, the mobile device 2 stores data (hereinafter referred to as a transmission record) corresponding to the received transmission. The transmission record preferably includes the transmitter identifier. The transmission record preferably also includes data specifying a proximity of the transmitter 37 to the mobile device 2. The mobile device 2 preferably determines the proximity from a signal strength of the transmission, which generally varies as the inverse of the proximity squared. In some instances, the transmission includes data indicative of the signal strength at a particular distance from the transmitter 37, to facilitate determination of the proximity. The transmission record preferably also includes a timestamp associated with the transmission. The mobile device 2 stores the current transmission record and also preferably stores previous transmission location records.

Figure 7:
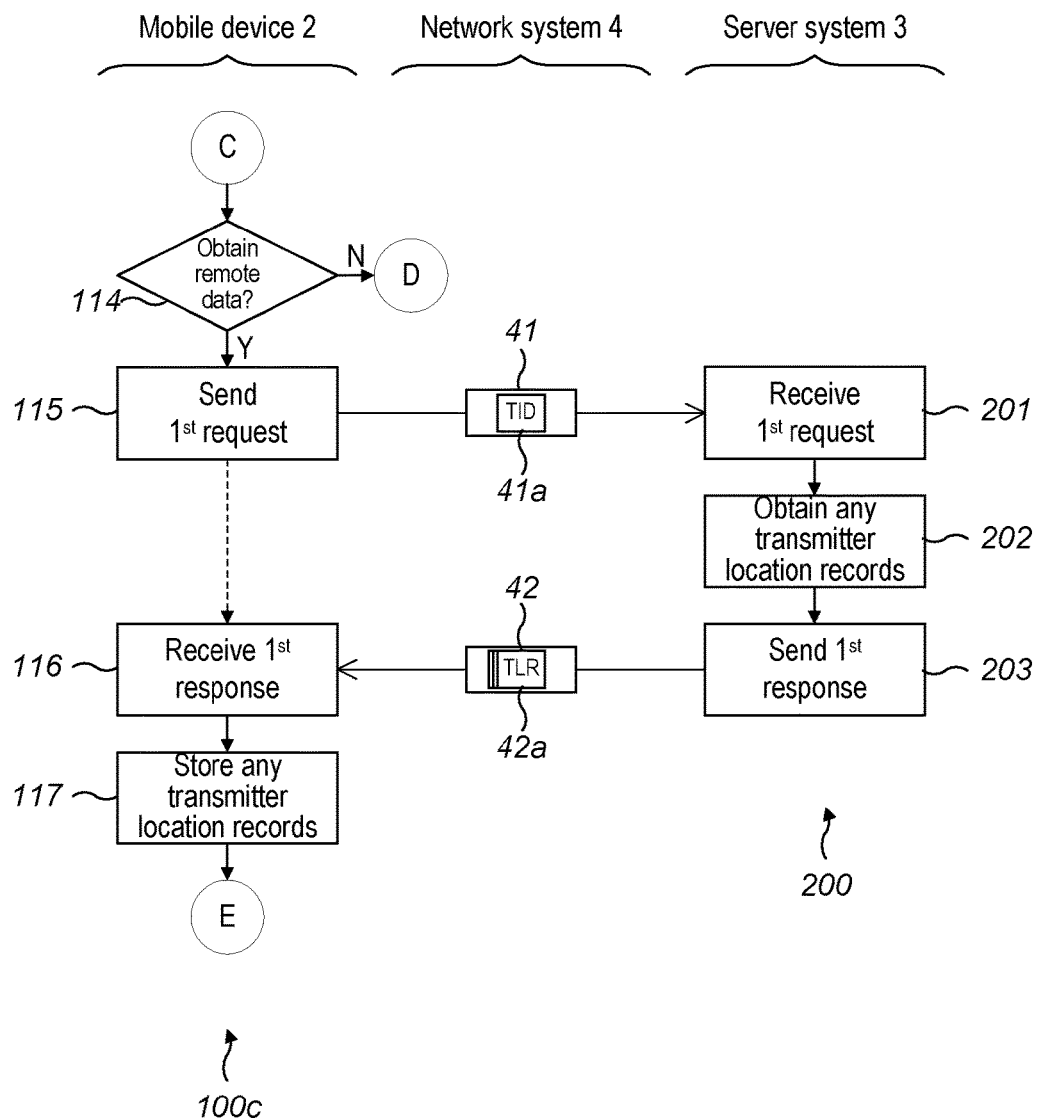
FIG. 7 illustrates another part of the method of FIG. 4 and an inter-related method which can be performed by a server system included in the system of FIG. 1.

At an eighth step 108, the mobile device 2 determines if the local database 16 includes at least one record (hereinafter referred to as a transmitter location record) relating to the transmitter 37. As will be explained in more detail below, the mobile device 2 may store a plurality of transmitter location records relating to transmitters 37 in a region around the mobile device 2. Each transmitter location record includes a transmitter identifier and data (hereinafter referred to as transmitter location data) specifying the location of the transmitter 37 and the accuracy of this location. The location of the transmitter 37 is preferably specified as a latitude value and a longitude value. The local database 16 may include more than one transmitter location record relating to the transmitter 37 if, for example, there is more than one transmitter 37 with the same transmitter identifier. If the local database 16 includes at least one transmitter location record relating to the transmitter 37, then the first method 100 proceeds to a ninth step 109. If not, then the first method 100 proceeds to a fourteenth step 114 (FIG. 7).

At the ninth step 109, the mobile device 2 determines if at least one transmitter location record identified at the seventh step 107 includes transmitter location data that is consistent with the current device location data. This preferably involves determining if a (circular) region around the location of the transmitter 37 overlaps with a (circular) region around the current location of the mobile device 2. The size (radius) of each of these regions preferably depends upon the accuracy of each location. For example, the radius may equal the accuracy. If there are consistent location data, then the first method 100 proceeds to a tenth step 110. If not, in which case the transmitter location record is likely to relate to a different actual transmitter 37, then the first method 100 proceeds to the fourteenth step 114.

Figure 5:
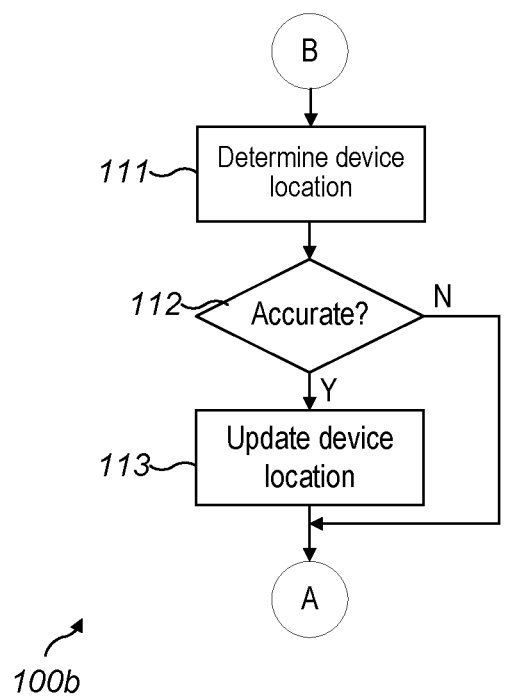
FIG. 5 illustrates another part of the method of FIG. 4.

At the tenth step 110, the mobile device 2 determines if the transmitter location record identified in the ninth step 109 (or, if more than one such record was identified, then the most consistent record) includes transmitter location data with an accuracy above a suitable predetermined accuracy (e.g. of the order of tens or hundreds of meters). In some examples, the predetermined accuracy may depend upon various factors. If the accuracy is above the predetermined accuracy, then the first method 100 proceeds to an eleventh step 111 (FIG. 5). If not, in which case the transmitter location record is considered insufficiently accurate, then the first method 100 proceeds to the fourteenth step 114.

Referring to FIG. 5, another part 100b of the first method 100 will now be described. This part 100b is performed if the local database 16 includes a consistent and sufficiently accurate transmitter location record for the transmitter 37.

At an eleventh step 111, the current location of the mobile device 2 and preferably also the accuracy of this location is determined using data from the transmitter location record.

This can be performed in any suitable way.

Figure 6:
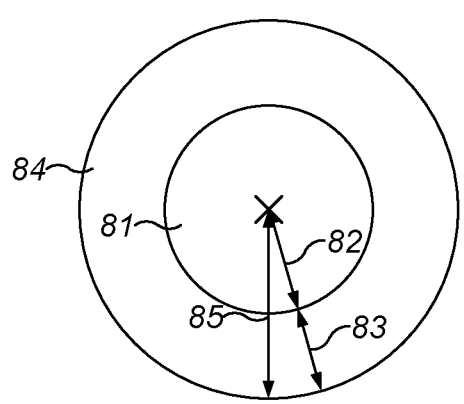
FIG. 6 illustrates a determination of an accuracy of a location of a mobile device, which can be performed at a step of the method of FIG. 5.

For example, the current location of the mobile device 2 may be determined to be the same as the location of the transmitter 37. The accuracy of the location of the mobile device 2 may be determined to be a function of (e.g. equal to the sum of) the accuracy of the location of the transmitter 37 and the proximity of the transmitter 37 to the mobile device 2 as specified in the transmission record. Referring to FIG. 6, this is because the transmitter 37 is expected to be located in a circular region 81 (hereinafter referred to as a first circular region) with a radius 82 which corresponds to the accuracy of the location of the transmitter 37. The mobile device 2 is located a distance 83 from the transmitter 37, as specified by the proximity. Hence the mobile device 2 is expected to be located in a larger circular region 84 (hereinafter referred to as a second circular region) with a radius 85 equal to the sum of the radius 82 of the first circular region 81 and the distance/proximity 83.

In some examples, the current location of the mobile device 2 and the accuracy of this location may be determined from transmitter location records relating to two or more transmitters 37. Transmissions from these two or more transmitters 37 may have been received and processed as described above over substantially the same time period. This can be performed in any suitable way. For example, the current location of the mobile device 2 and the accuracy of this location may be determined based upon a region of intersection of two or more second circular regions as described above (or scaled versions thereof) respectively associated with the two or more transmitters 37. Such a method can be referred to as a type of trilateration.

In some examples, the current location of the mobile device 2 and the accuracy of this location may be determined from one or more transmitter location records and one or more other types of data. However, at this step, the mobile device 2 preferably avoids activating the GNSS receiver.

At a twelfth step 112, the mobile device 2 determines if the accuracy of the location of the mobile device 2 determined at the eleventh step 111 is above a suitable predetermined accuracy. The predetermined accuracy may depend, for example, on the accuracy of the device location data last stored by the mobile device 2. If the accuracy is above the predetermined accuracy, then the first method 100 proceeds to a thirteenth step 113. If not, then the first method 100 returns to the third step 103.

At the thirteenth step 113, the mobile device 2 updates the device location data by storing the location of the mobile device 2 and the accuracy of this location determined at the eleventh step 111.

Thus, the mobile device 2 can update its device location data in an effective way. In particular, the updating can be performed relatively accurately without having to activate the GNSS receiver and hence at a relatively low energy cost. The device location data can be used by other parts of the compatible application 15, for example when obtaining data about elements, e.g. other mobile users, in a vicinity of the location of the mobile device 2.

The first method 100 then returns to the third step 103.

Referring to FIG. 7, another part 100c of the first method 100 will now be described. This part 100c is performed if the local database 16 does not include a consistent and sufficiently accurate transmitter location record for the transmitter 37. An interrelated method 200 (hereinafter referred to as the second method) performed by the server system 3 will also be described.

Figure 8:
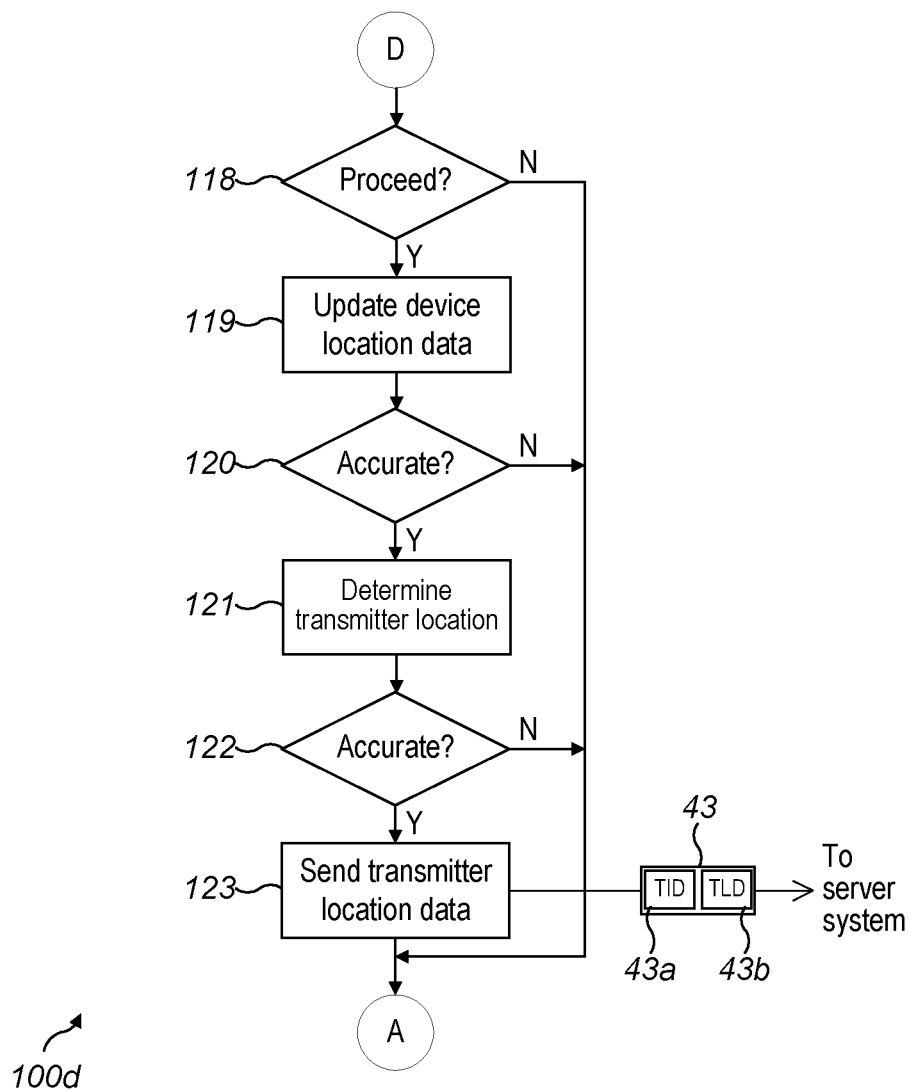
FIG. 8 illustrates another part of the method of FIG. 4.

At the fourteenth step 114, the mobile device 2 determines if there is to be an attempt to obtain a transmitter location record from the global database 23. This step may involve determining if the time since the mobile device 2 last made such an attempt is above a suitable predetermined time interval (e.g. of the order of hours). If there is to be such an attempt, then the first method 100 proceeds to a fifteenth step 115. If not, then the first method 100 proceeds to an eighteenth step 118 (FIG. 8).

At the fifteenth step 115, the mobile device 2 sends a request 41 of a first type (hereinafter referred to as a first request) to the server system 3. The first request 41 is a request for any transmitter location records relating to the transmitter 37, i.e. the transmitter 37 from which the transmission was received at the fifth step 115. The first request 41 includes data 41a corresponding to the transmitter identifier ('TID' in the figure).

At first, second and third steps 201, 202, 203 of the second method 200, the server system 3 respectively receives the first request 41, queries the global database 23 to obtain any transmitter location records relating to the transmitter 37, and sends a response 42 of a first type (hereinafter referred to as a first response) to the mobile device 2. The first response 42 includes data 42a corresponding to any transmitter location records ('TLR' in the figure) obtained at the second step 202.

At sixteenth and seventeenth steps 116, 117, the mobile device 2 respectively receives the first response 42 (if such a response can be received) and stores the transmitter location records included therein (if there are any such records) in the local database 16.

Thus, the mobile device 2 can obtain transmitter location records from the global database 23 in suitable circumstances.

The first method 100 then returns to the eighth step 108 to determine if the local database 16 now includes a consistent and sufficiently accurate transmitter location record for the transmitter 37. If so, then this record may be used as described above in relation to the eleventh, twelfth and thirteenth steps 111, 112, 113. If not, then, as described above, the first method 100 may proceed via the fourteenth step 114 to the eighteenth step 118.

Referring to FIG. 8, another part 100d of the first method 100 will now be described. This part 100d is performed if, for example, neither the local database 16 nor the global database 23 includes a consistent and sufficiently accurate transmitter location record for the transmitter 37, i.e. the transmitter 37 from which the transmission was received in the fifth step 115.

At the eighteenth step 118, the mobile device 2 determines if the first method 100 is to proceed with providing transmitter location data for the transmitter 37 to the server system 3. This step preferably involves determining if the mobile device 2 is currently in a relevant state. This state may be controlled, for example, by a user input, battery level, etc. If appropriate, then the first method 100 proceeds to a nineteenth step 119. If not, then the first method 100 returns to the third step 103.

At the nineteenth step 119, the mobile device 2 preferably updates the device location data. The mobile device 2 may use any of the abovedescribed types of data, including, amongst other things, transmitter location records relating to one or more other transmitters 37 and satellite location data. The mobile device 2 preferably uses the lowest-cost data required to determine the current location of the mobile device 2 with an accuracy above a suitable predetermined accuracy. The predetermined accuracy may depend upon e.g. the accuracy of the location of the transmitter 37 specified in an existing transmitter location record.

At a twentieth step 120, the mobile device 2 determines if the accuracy of the current location of the mobile device 2 is above a suitable predetermined accuracy. The predetermined accuracy preferably corresponds to that described above in relation to the nineteenth step 119. If so, then the first method 100 proceeds to a twenty-first step 121. If not, in which case the current device location data is not considered sufficiently accurate for determining the location of the transmitter 37, then the first method 100 returns to the third step 103.

At the twenty-first step 121, the mobile device 2 determines transmitter location data for the transmitter 37 using the current device location data.

This can be performed in any suitable way.

For example, the location of the transmitter 37 may be determined to be the same as the current location of the mobile device 2. The accuracy of the location of the transmitter 37 may be determined to be a function of (e.g. equal to the sum of) the accuracy of the location of the mobile device 2 and the proximity of the transmitter 37 to the mobile device 2 as specified in the transmission record. This is for similar reasons to those described above with reference to FIG. 6.

In some examples, the location of the transmitter 37 may be determined from the current device location data and the current transmission record together with previous device location data and previous transmission records relating to the same transmitter 37. This can be performed in any suitable way. For example, the location of the transmitter may be determined based upon a region of intersection of a plurality of (circular) regions. Each circular region may be centred on a location of the mobile device 2 and may have a radius corresponding to a function (e.g. the sum) of the accuracy of that location and the proximity of the transmitter 37 to the mobile device 2 at that location.

At a twenty-second step 122, the mobile device 2 determines if the accuracy of the location of the transmitter 37 determined at the twenty-first step 121 is above a predetermined accuracy. The predetermined accuracy may depend upon, e.g. the accuracy of the location of the transmitter 37 specified in an existing transmitter location record. If so, then the first method 100 proceeds to a twenty-third step 123. If not, in which case the transmitter location data is not considered sufficiently accurate to be sent to the server system 3, then the first method 100 returns to the third step 103.

At the twenty-third step 123, the mobile device 2 sends a message 43 of a first type (hereinafter referred to as a first message) to the server system 3. The first message 43 includes data 43a corresponding to the transmitter identifier ('TID' in the figure) and data 43b specifying the location of the transmitter 37 and the accuracy of this location ('TLD' in the figure).

Thus, the mobile device 2 can provide transmitter location data to the server system 3 in suitable circumstances.

The first method then returns to the third step 103.

Figure 9:
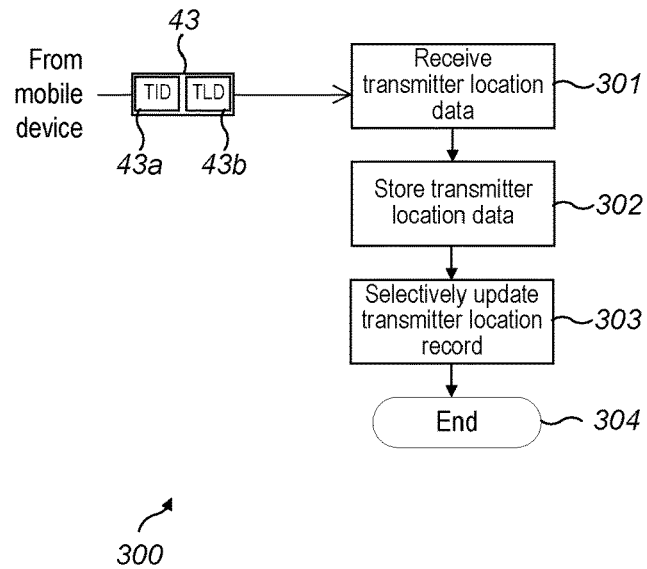
FIG. 9 illustrates a method which can be performed by the server system included in the system of FIG. 1.

Referring to FIG. 9, a method 300 (hereinafter referred to as a third method) will now be described. The third method 300 is performed by the server system 3.

At a first step 301, the server system 3 receives a first message 43 from a mobile device 2. The first message 43 was preferably sent as described above in relation to the twenty-third step 123 of the first method 100. The transmitter identifier of the transmitter 37 to which the first message 43 relates is hereinafter referred to as the particular transmitter identifier.

At a second step 302, the server system 3 stores data (hereinafter referred to as a message record) including data corresponding to the data included in the first message 43 and preferably also a timestamp associated with the first message 43.

At a third step 303, the server system 3 selectively updates the global database 23 using data from the message record stored at the second step 302 and, if applicable, data from one or more other (previously received) message records relating to the particular transmitter identifier.

Figure 10:
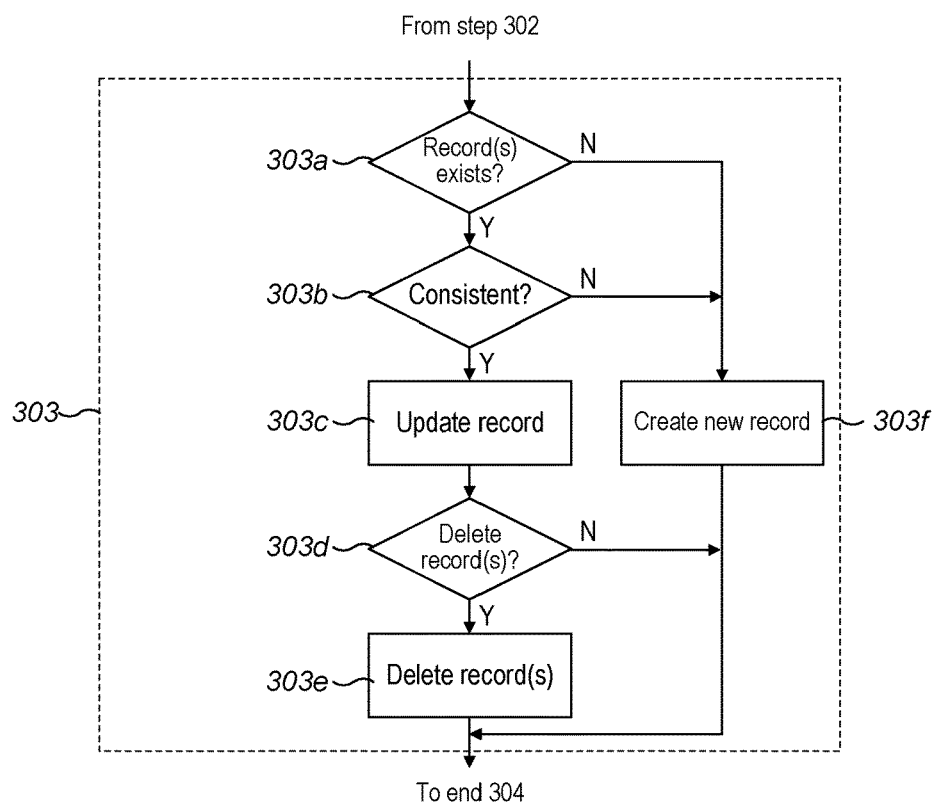
FIG. 10 illustrates in more detail a step of the method of FIG. 9.

Referring to FIG. 10, the third step 303 will now be described in more detail.

At a first sub-step 303a, the server system 3 determines if the global database 23 includes at least one transmitter location record relating to the particular transmitter identifier. If so, then the third method 300 proceeds to the second sub-step 303b. If not, then the third method 300 proceeds to the sixth sub-step 303f (described below).

At a second sub-step 303b, the server system 3 determines if at least one transmitter location record identified at the first sub-step 303a includes transmitter location data that is consistent with the transmitter location data in the message record. This step can be performed as described above in relation to the ninth step 109 of the first method 100. If there are consistent transmitter location data, then the third method 300 proceeds to a third sub-step 303c. If not, then the third method 300 proceeds to the sixth sub-step 303f.

At the third sub-step 303c, the server system 3 updates the transmitter location record identified at the second sub-step 303b (or, if more than one such record was identified, then the most consistent record). In particular, the server system 3 associates the message record with the transmitter location record. The server system 3 updates the transmitter location data in the transmitter location record using the transmitter location data in the message record. The server system 3 preferably also uses transmitter location data in one or more other message records associated with the transmitter location record. This can be performed in any suitable way. For example, the location of the transmitter 37 and the accuracy of this location may be determined based upon a region of intersection of a plurality of (circular) regions. Each circular region may be centred on a location of the transmitter 37 as specified in a message record and may have a radius corresponding to a function of the accuracy of that location.

At a fourth sub-step 303d, the server system 3 determines whether one or more transmitter location records associated with the particular transmitter identifier are to be deleted. This may involve determining the time since a first message was last received including transmission location data consistent with a transmitter location record. This may involve determining a number of first messages received including transmission location data consistent with other transmitter location records since a first message was last received including transmission location data consistent with the transmitter location record. The step may involve determining if the time and/or the number is above a suitable predetermined level. If one or more transmitter location records are to be deleted, then the third method 300 proceeds to a fifth sub-step 303e. If not, then the third method 300 proceeds to a fourth step 304 (described below).

At the fifth sub-step 304e, the server system 3 deletes the one or more transmission records identified at the fourth sub-step 304d. Thus, transmitter location records that are invalid, for example because the transmitter 37 has moved, are suitably removed from the global database 23.

At the sixth step 304f, i.e. when the global database 23 does not include at least one transmitter location record relating to the particular transmitter identifier, the server system 3 creates a new transmitter location record including data corresponding to the data in the message record. The server system 3 associates the message record with the new transmitter location record. In some examples, a transmitter location record may be marked as 'preliminary' until the transmitter location record has more than a predetermined number of associated message records and/or has location data with an accuracy above a suitable predetermined accuracy.

The third method 300 ends at the fourth step 304. The third method 300 is repeated whenever a first message 43 is received.

Thus, the server system 3 can update the global database 23 using a plurality of first messages 74 in a robust way, e.g. handling duplicate transmitter identifiers, spurious messages, etc.

Figure 11:
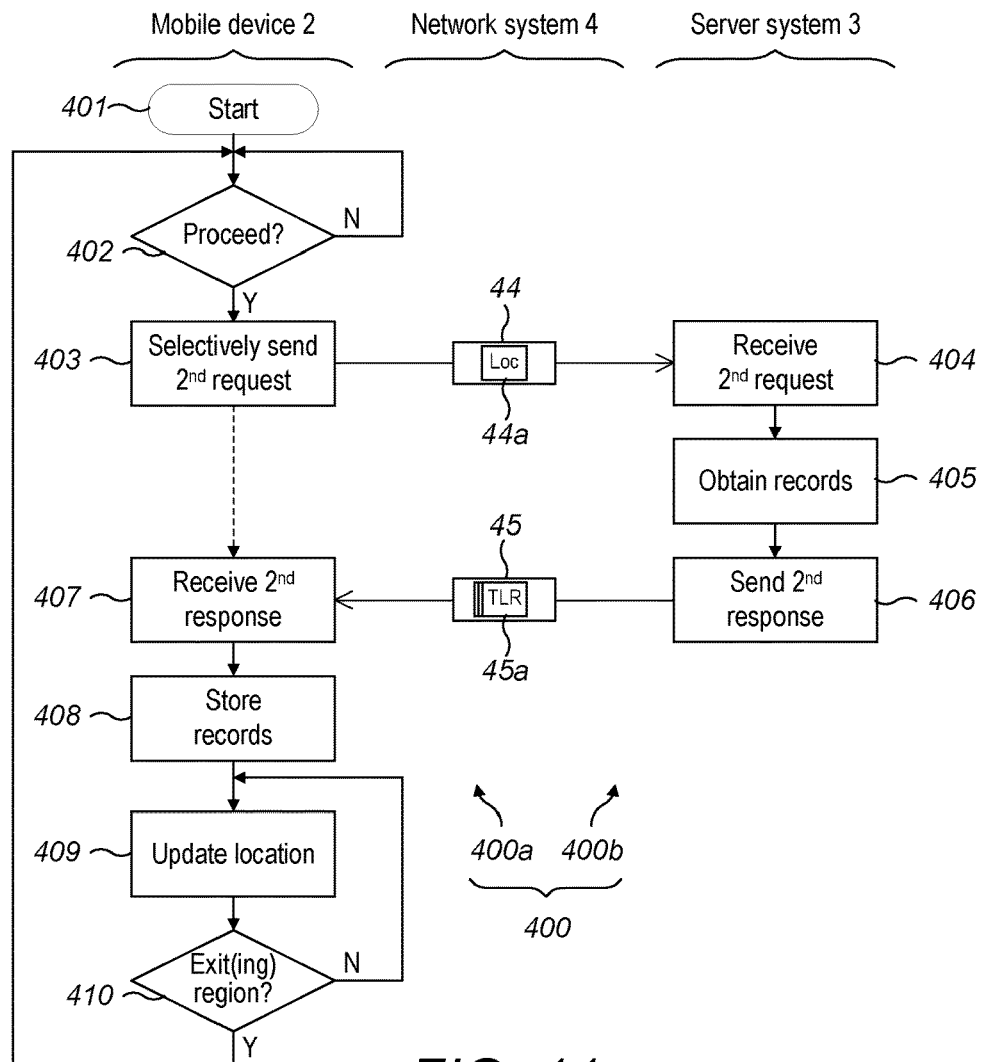
FIG. 11 illustrates a method which can be performed by components of the system of FIG. 1.

Referring to FIG. 11, a method 400 (hereinafter referred to as the fourth method) will now be described. The fourth method 400 includes a first part 400a performed by a mobile device 2 and an interrelated second part 400b performed by the server system 3.

At a first step 401, the fourth method 400 starts at the mobile device 2. The fourth method 400 is preferably started whenever the compatible application 15 is run.

At a second step 402, the mobile device 2 determines if the fourth method 400 is to proceed. This step can be performed as described above in relation to the third step 103 of the first method 100. If so, for example because the current speed of the mobile device 2 is below a suitable predetermined speed, then the fourth method 400 proceeds to a third step 403. If not, then the second step 402 is repeated.

At the third step 403, the mobile device 2 selectively sends a request 44 of a second type (hereinafter referred to as a second request) to the server system 3. The second request 44 is a request for transmitter location data for transmitters 37 located in a region around the mobile device 2. The second request 44 preferably includes data 44a specifying at least the current location of the mobile device 2 ('Loc' in the figure).

At a fourth step 404, the server system 3 receives the second request 44.

Figure 15:
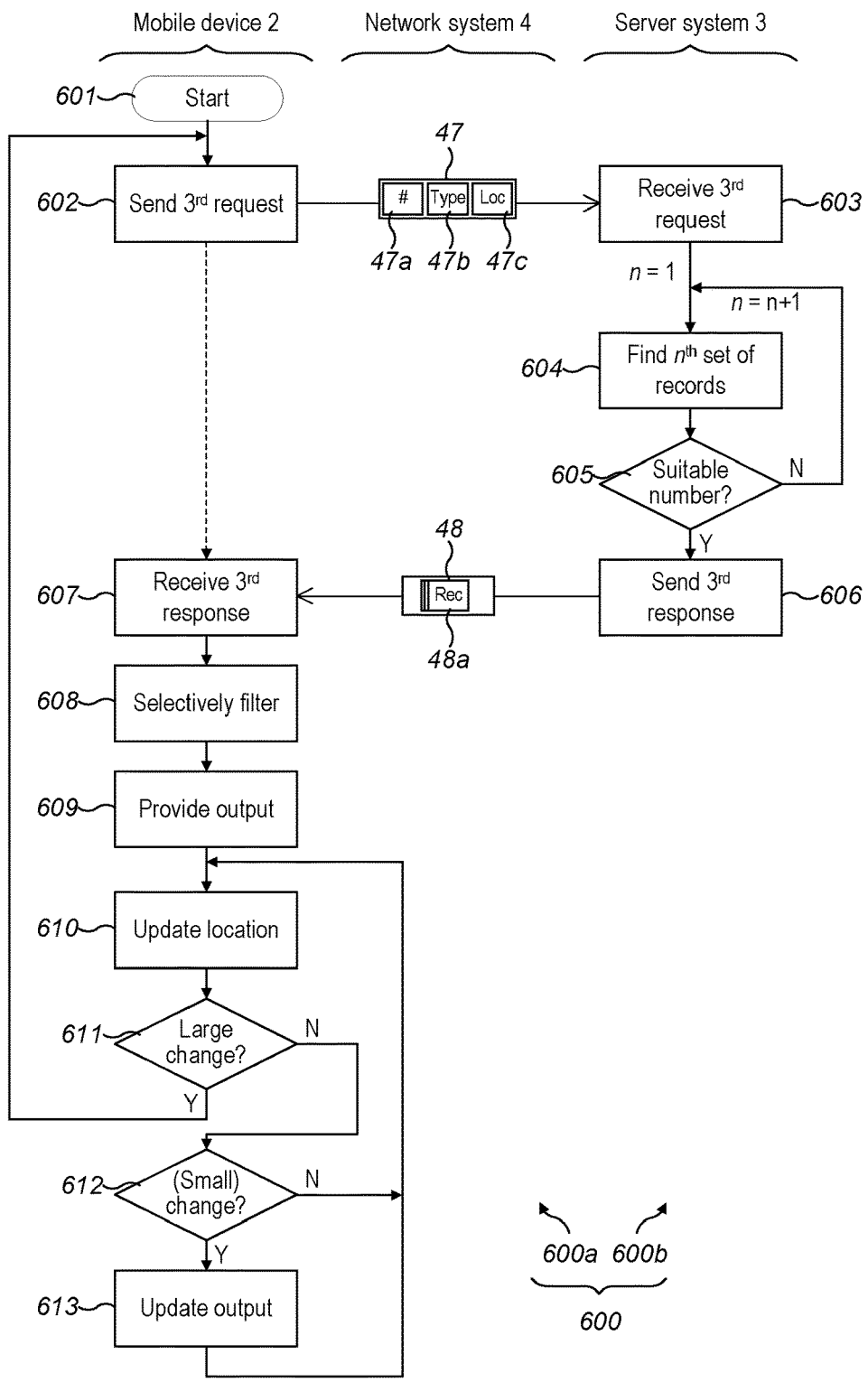
FIG. 15 illustrates another method which can be performed by components of the system of FIG. 1.

At a fifth step 405, the server system 3 queries the global database 23 to obtain transmitter location records for transmitters 37 located in a region around the mobile device 2. The centre of this region is preferably defined by the data in the second request 44 specifying the location of the mobile device 2. The size of the region may be predetermined for the system 1. The size of the region may be determined by the mobile device 2 and indicated in the second request 44. The size of the region may be determined by the server system 3. A predetermined number of transmitter location records for transmitters 37 in the vicinity of the mobile device 2 may be obtained, as explained below in relation to the sixth method 600 (FIG. 15).

At a sixth step 406, the server system 3 sends a response 45 of a second type (hereinafter referred to as a second response) to the mobile device 2. The second response 45 includes data 45a corresponding to the transmitter location records obtained at the fifth step 405. The second response 45 preferably also includes data (not shown) identifying the region, e.g. the centre and/or size of the region.

At a seventh step 407, the mobile device 2 receives the second response 45 (if such a response can be received).

At an eighth step 408, the mobile device 2 stores the transmitter location records included in the second response 45 in the local database 16. Any duplicate transmitter location records which are already in the local database 16 need not be stored. The mobile device 2 also stores data identifying the region, which may have been identified in the second response 45 and/or determined by the mobile device 2.

As will be explained below, the abovedescribed steps 402 . . . 408 may be repeated several times. Accordingly, referring to FIG. 12, the mobile device 2 may store transmitter location records for transmitters 37 located in several regions $51_1$ . . . $51_5$ (hereinafter referred to as first regions) as well as data identifying the first regions.

Referring to FIG. 11, at a ninth step 409, the mobile device 2 updates the device location data, i.e. data specifying the location of the mobile device 2 and the accuracy of this location. This may be performed, for example, in any one or more of the ways described above in relation to the first method 100.

Figure 12:
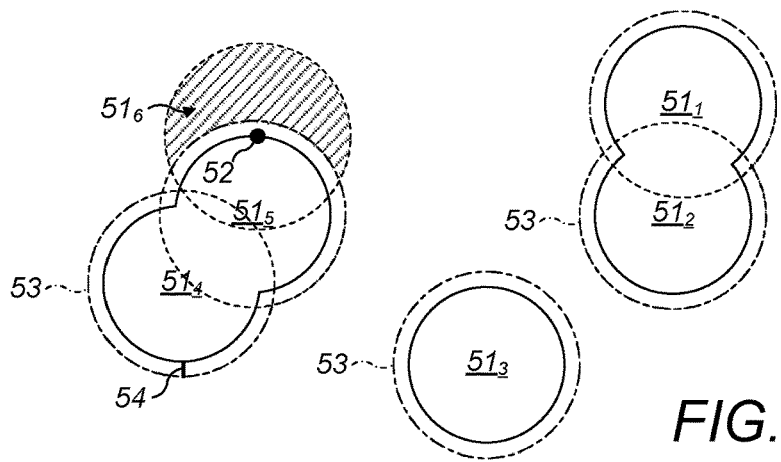
FIG. 12 illustrates a determination of whether a mobile device has exited or is close to a perimeter of one or more regions, which can be performed at a step of the method of FIG. 11.

Referring to FIGS. 11 and 12, at a tenth step 410, the mobile device 2 determines if the location 52 of the mobile device 2 is outside the one or more first regions $51_1$ . . . $51_5$ or is close to (e.g. within a suitable predetermined distance 54 of) a perimeter 53 of the one or more first regions $51_1$ . . . $51_5$. If so, then the fourth method 400 returns to the second step 402 and the mobile device 2 may proceed to obtain transmitter location records for transmitters 37 in a new region $51_6$ around the location 52 of the mobile device 2. If not, then the fourth method 400 returns to the ninth step 409.

Thus, the mobile device 2 can obtain data for performing transmitter-based location updates in an effective and efficient way.

Second Set of Methods

A set of methods (hereinafter referred to as the second set of methods) which can be performed by components of the system 1 will now be described.

Figure 13:
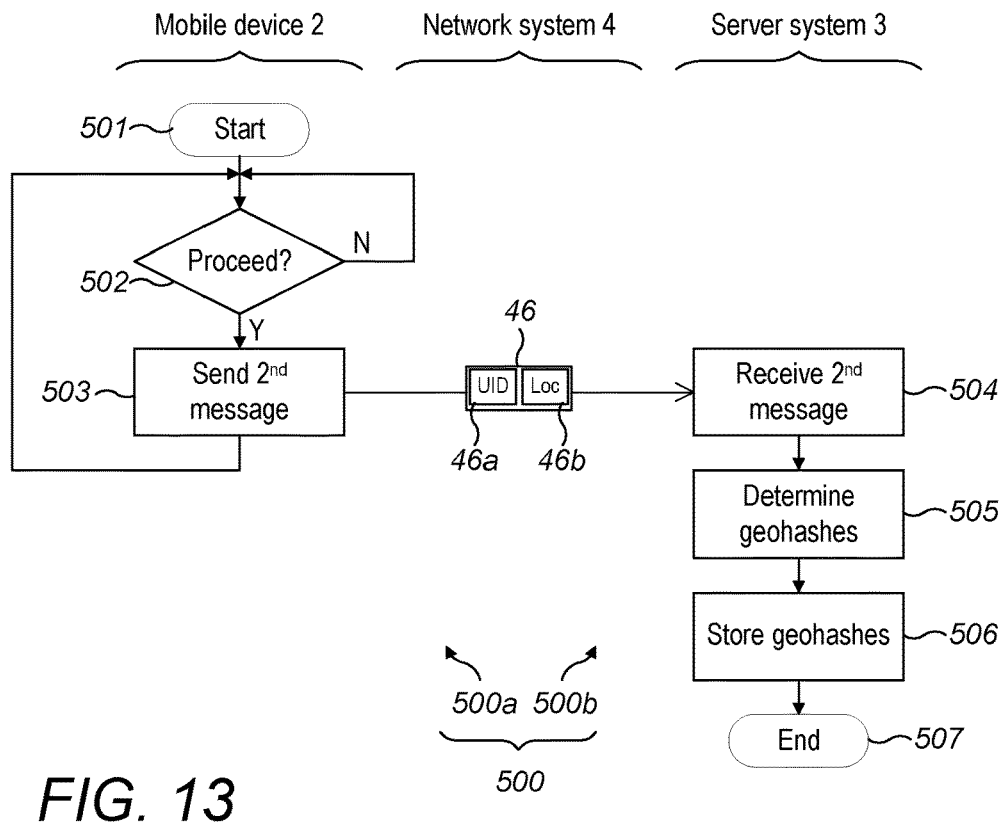
FIG. 13 illustrates another method which can be performed by components of the system of FIG. 1.

Referring to FIG. 13, a method (hereinafter referred to as the fifth method) will now be described. The fifth method 500 includes a part 500a performed by a mobile device 2 and an interrelated part 500b performed by the server system 3. Preferably, each mobile device 2 in the system 1 performs the relevant part 500a of the fifth method 500.

At a first step 501, the fifth method 500 starts at the mobile device 2. The fifth method 500 may be started whenever the compatible application 15 is run or may be started in any other suitable way, e.g. by another part of the compatible application 15, in response to a user input, etc.

At a second step 502, the mobile device 2 determines if the fifth method 500 is to proceed. For example, this may involve determining if a current speed of the mobile device 2 is below a suitable predetermined speed, if the (straight-line) distance between the current location of the mobile device 2 and the location at which the mobile device 2 last proceeded is above a suitable predetermined distance, if the time since the mobile device 2 last proceeded is above a suitable predetermined time, and/or if the accuracy of the current location of the mobile device 2 is above a predetermined accuracy. If appropriate, then the fifth method 500 proceeds to a third step 503. If not, then the second step 502 is repeated.

At the third step 503, a mobile device 2 sends a message 46 of a second type (hereinafter referred to as the second message) to the server system 3. The second message 46 includes data 46a identifying the mobile user ('UID' in the figure) and data 46b identifying the current location of the mobile device 2 ('Loc' in the figure). The mobile user may be identified by way of a unique identifier, e.g. a username. The current location of the mobile device 2 may have been determined, for example, in any one or more of the ways described above in relation to the first method 100.

At a fourth step 504, the server system 3 receives the second message 46.

At a fifth step 505, the server system 3 determines a set of geohashes corresponding to the location of the mobile device 2 specified in the second message 46.

Figure 14:
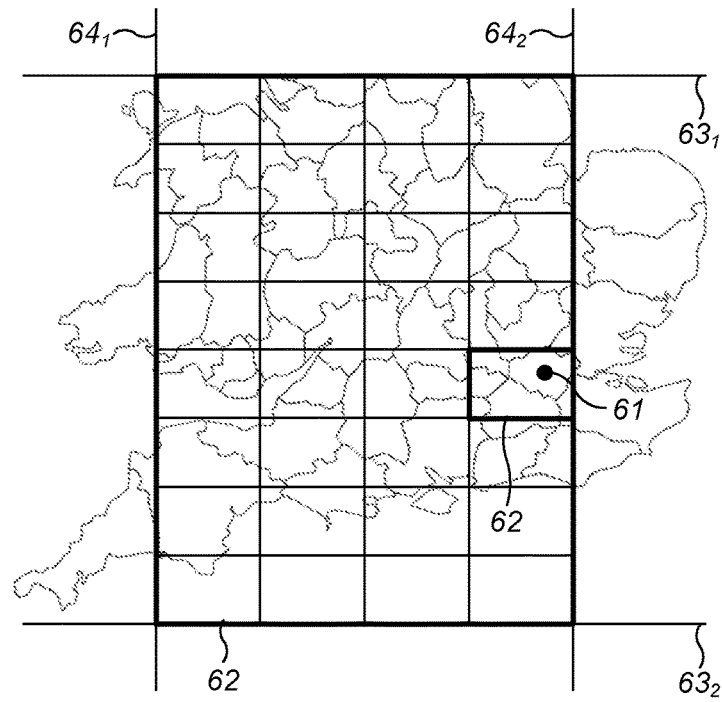
FIG. 14 illustrates geohashes used in the method of FIG. 13.

Referring to FIG. 14, a geohash corresponding to a particular location 61 is a code that uniquely defines a geographical region 62 in which the particular location 61 sits. The geographical region 62 preferably corresponds to a (pseudo-rectangular) area between two lines of constant latitude $63_1$, $63_2$ and two lines of constant longitude $64_1$, $64_2$. However, this need not be the case. For a particular location 61, there is a series of geohashes (hereinafter referred to as corresponding geohashes). Each of the corresponding geohashes defines a differently sized geographical region 62 in which the location sits. The corresponding geohashes can be described as being at different levels, wherein a lower level corresponds to a smaller geographical area. The geographical region 62 defined by a geohash at a particular level (other than the highest possible level) is a subdivision of the geographical region 62 defined by a corresponding geohash at the level above the particular level. The geohash preferably corresponds to a string of characters, e.g. using a base 32 representation. A geohash at a particular level (other than the highest possible level) is preferably obtained from a corresponding geohash at the level above the particular level by the addition of a character, and vice versa. For example, the geohash 'ESU3Z' may define e.g. a 20 km$^2$ area, and the lower-level geohash "ESU3ZG" may define e.g. a 1 km$^2$ area. A geohash with a length N (e.g. with N characters) can be described as being at level N.

The server system 3 preferably determines geohashes at a suitable predetermined set of levels (hereinafter referred to as relevant levels). For example, the relevant levels may correspond to eight successive levels.

Referring to FIG. 13, at a sixth step 506, the server system 3 stores the geohashes determined at the fifth step 505 in the global database 23. In particular, the server system 3 preferably stores the geohashes in a record (hereinafter referred to as a user record) corresponding to the mobile user. The global database 23 is preferably indexed by the geohashes, i.e. has an index which includes the geohashes. Accordingly, the server system 3 preferably also updates this index.

The part 500b of the fifth method 500 performed by the server system 3 ends at a seventh step 507. After performing the third step 503, the mobile device 2 returns to the second step 502 and the abovedescribed steps 502, 503 . . . of the fifth method are repeated.

Thus, the global database 23 can store recent data related to the locations of mobile users/mobile devices $2_1$ . . . $2_N$.

Referring to FIG. 15, a method 600 (hereinafter referred to as the sixth method) will now be described. The sixth method 600 includes a part 600a performed by a mobile device 2 and an interrelated part 600b performed by the server system 3.

At a first step 601, the sixth method 600 starts at the mobile device 2. The sixth method 600 may be started in any suitable way, e.g. by another part of the compatible application 15, in response to a user input, etc. For example, there may be a need to obtain data about nearby elements.

At a second step 602, a mobile device 2 sends a request 47 of a third type (hereinafter referred to as a third request) to the server system 3. The third request 47 corresponds to a request for data relating to elements in a vicinity of a location (preferably the current location) of the mobile device 2. The elements may be, for example, mobile devices 2 of other mobile users. The third request 47 preferably includes data 47a specifying the number (hereinafter referred to as the requested number) of elements in relation to which the data is being requested. The third request 47 also preferably includes data 47*b* specifying a type (hereinafter referred to as the element type) of the elements in relation to which the data is being requested. The third request 47 also preferably includes data 47*c* specifying the location of the mobile device 2. In the figure, the requested number, element type and location of the mobile device 2 are respectively denoted by '#', 'Type' and 'Loc'. However, as will be explained in more detail below, one or more of these data 47*a*, 47*b*, 47*c* need not be included in the third request 47. The third request 47 may also include data (not shown) specifying the type of data (hereinafter referred to as the requested fields) which is being requested.

At a third step 603, the server system 3 receives the third request 47.

Figures 16, 17:
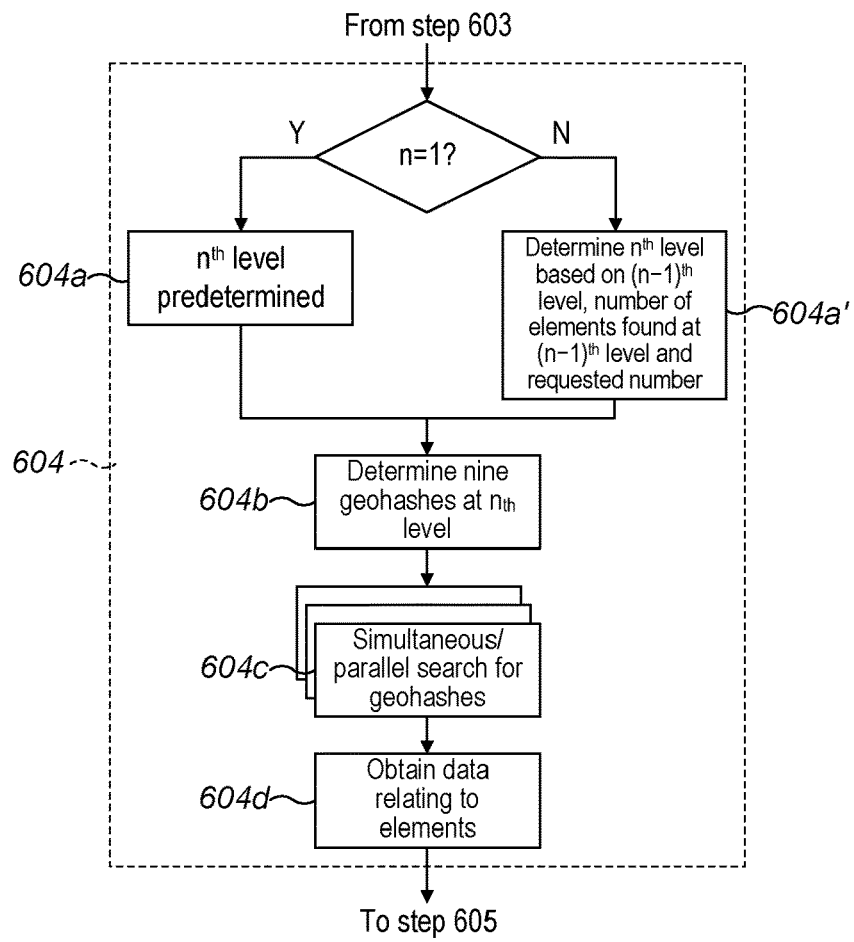
FIG. 16 illustrates in more detail a step of the method of FIG. 15.
FIG. 17 illustrates a three-by-three grid of geohashes used in the method of FIG. 16.

Referring to FIG. 16, a first occurrence (n=1) of a fourth step 604 will now be described. As will be explained in more detail below, the fourth step 604 may be repeated several times.

At the first occurrence (n=1) of the fourth step 604, the server system 3 performs several sub-steps 604$_a$ . . . 604*d* resulting in the server system 3 finding a set of elements (hereinafter referred to as the first set of elements) in the global database 23.

At the first sub-step 604*a*, the server system 3 determines a level to be used for the geohashes in the subsequent sub-steps 604*b* . . . 604*d*. For the first occurrence of the fourth step 604, a suitable predetermined first level is used. The first level may be fixed for the system 1, the compatible application 15 and/or the element type, etc. The first level is preferably selected such the sixth method 600 is generally performed most efficiently.

At the second sub-step 604*b*, the server system 3 determines a set of nine geohashes around the location of the mobile device 2 specified in the third request 47. In examples in which the location of the mobile device 2 is not specified in the third request 47, the server system 3 may determine the location of the mobile device 2 in another way, e.g. by obtaining it from the mobile device 2 or from the global database 23. The nine geohashes are determined at the level determined at the first sub-step 604*a*. Referring to FIG. 17, the nine geohashes preferably correspond to a geohash that defines the geographical region 62$_1$' (hereinafter referred to as a first geographical region) that includes the location 61' of the mobile device 2 and the eight geohashes that define the eight geographical regions 62$_2$' . . . 62$_9$' that are nearest to the first geographical region 62$_1$'. Hence the nine geohashes define a three-by-three grid of geographical regions 62$_1$' . . . 62$_9$'. In other examples, the server system 3 may determine another number of geohashes, e.g. twenty-five geohashes. However, nine geohashes generally provides the best overall performance.

Referring to FIG. 16, at the third sub-step 604*c*, the server system 3 searches the global database 23 for any records which correspond to the element type specified in the third request 47 and which include any of the nine geohashes identified at the second sub-step 604*b*. In examples in which the element type is not specified in the third request 47, the server system 3 may determine the element type in another way. For example, there may be a predetermined element type for a particular compatible application 15, etc. The server system 3 performs simultaneous, parallel searches in relation to each of the nine geohashes. Each search may be performed, for example, by a different processor in the server system 3. Each search is preferably performed using an index that includes geohashes.

Thus, the server system 3 can perform the search quickly.

At the fourth sub-step 604*d*, the server system 3 preferably obtains data from the requested fields of each record found at the third sub-step 604*c*. In examples in which the requested fields are not specified in the third request 47, the server system 3 may determine the requested fields in another way. Some or all of the requested fields may be predetermined for a particular compatible application 15, element type, mobile user, etc. In some examples, instead of obtaining data from the requested fields of the records, the server system 3 may obtain data (e.g. a unique key) enabling the records to be identified at a subsequent step.

Referring to FIG. 15, at a first occurrence of a fifth step 605, the server system 3 determines if the number (hereinafter referred to as the first number) of records found at the first occurrence of the fourth step 604 is suitable. In particular, the server system 3 compares the first number with the requested number. In examples in which the requested number is not specified in the third request 47, the server system 3 may determine the requested number in another way. For example, there may be a suitable predetermined requested number for a particular compatible application 15, element type, etc.

The server system 3 preferably determines if the first number is suitable by determining if the first number is sufficiently close to the requested number, e.g. if the magnitude of the difference between the first number and the requested number is less than a suitable predetermined (absolute or relative) difference. Furthermore, the server system 3 preferably determines if the first number is suitable by determining if the first number exceeds the requested number by any amount.

If the first number is suitable, then the sixth method 600 proceeds to a sixth step 606.

Thus, the server system 3 can conclude the sixth method 600 quickly. As will become apparent, because of the way data is output by the mobile device 2, providing data relating to a different number, or a larger number, of elements than the requested number is not particularly disadvantageous.

If the first number is not suitable, then the sixth method 600 returns to the fourth step 604.

At a second (n=2) occurrence of the fourth step 604, the server system 3 performs the same sub-steps except that, at a first sub-step 604*a*', the server system 3 determines a level (hereinafter referred to as the second level) to be used for the geohashes in subsequent sub-steps 604*b* . . . 604*d* in a different way. In particular, the server system 3 determines the second level based on the first level and a comparison between the first number, i.e. the number of records found at the first occurrence of the fourth step 604, and the requested number. If the first number is less than the requested number, then the second level is determined to be higher (i.e. corresponding to larger geographical regions) than the first level, and vice versa. Furthermore, the difference between the second level and the first level is preferably an increasing function of the magnitude of the difference between the first number and the requested number. For example, the level may be changed by one if the difference between the levels is within a first range, the level may be changed by two if the difference between the levels is within a second range, etc.

At a second occurrence of the fifth step 605, the server system 3 determines if the number (hereinafter referred to as the second number) of records found at the second occurrence of the fourth step 604 is suitable, as described above. If so, then the sixth method 600 proceeds to the sixth step 606. If not, then the sixth method 600 returns to the fourth step 604.

The fourth and fifth steps 604, 605 are repeated until a suitable number of records are found (or until the highest or lowest level has been reached).

At the sixth step 606, the server system 3 sends a response 48 of a third type (hereinafter referred to as a third response) to the mobile device 2. The third response 48 includes data 48a corresponding to the requested fields of the records found at the last occurrence of the fourth step 604 ('Rec' in the figure). In examples in which such data was not obtained as part of the fourth step 604, the data is preferably obtained as part of the sixth step 606, e.g. using unique keys identified as part of the fourth step 604. One of the requested fields preferably includes data specifying a location of the element. One or more of the requested fields preferably include data relating to the element. For example, where the elements are mobile users, the requested fields may correspond to a location, username, description, status, a uniform resource locator of a photograph (hereinafter referred to as 'photoURL'), etc.

At a seventh step 607, the mobile device 2 receives the third response 48.

Optionally, at an eighth step 608, the mobile device 2 filters the data (hereinafter referred to as the received data) in the third response 48. For example, the mobile device 2 may discard (or refrain from processing) a record if one or more of the data values in the record meet one or more criteria. This filtering at the mobile device 2 can be advantageous compared to filtering at the server system 3 because the reduced demand on the server system 3 has a larger positive effect on the overall speed/efficiency of the system 1 than the increased demands in terms of data communications (the amount of data is not large) and data processing by the mobile devices $2_1 \ldots 2_N$ (of which there are generally many).

The mobile device 2 preferably stores the (filtered) received data in the local database 16.

At a ninth step 609, the mobile device 2 provides an output via the mobile user interface representing at least some of the received data. The output is preferably dependent upon the location of the elements to which the data relates relative to the location of the mobile device 2. For example, the output may include a list sorted in order of decreasing proximity of the element to the mobile device 2. Other types of outputs, e.g. involving other text-based outputs or graphical outputs (e.g. maps), may also be provided.

At a tenth step 610, the mobile device 2 updates data specifying the location of the mobile device 2. This may be performed, for example, in any one or more of the ways described above in relation to the first method 100.

At an eleventh step 611, the mobile device 2 determines if there has been a large change in the location of the mobile device 2 such that the received data relates to elements that are no longer in the vicinity of the mobile device 2. This may be performed in any suitable way. If there has been such a change, then the sixth method 600 returns to the second step 602, i.e. the mobile device 2 sends another third request 47. If not, then the sixth method 600 proceeds to a twelfth step 612.

At the twelfth step 612, the mobile device 2 determines if there has been a (small) change in the location of the mobile device 2. In this instance, the change is such that the received data relates to one or more elements that are still in the vicinity of the mobile device 2. If there has such a change, then the sixth method 600 proceeds to a thirteenth step 613. If not, then the sixth method 600 returns to the tenth step 610.

At the thirteenth step 613, the mobile device 2 updates the output in light of the change in location of the mobile device 2. For example, where the output is a list sorted in order of decreasing proximity of the element to the mobile device 2, the list may be re-ordered as appropriate in light of the change of location of the mobile device 2.

The sixth method 600 then returns to the tenth step 610 and the abovedescribed steps 610 . . . 613 are repeated.

Thus, the mobile device 2 can update the output where possible without further communications with the server system 3 and the associated costs of these.

Third Set of Methods

A set of methods (hereinafter referred to as the third set of methods) which can be performed by components of the system 1 will now be described.

Figure 18:
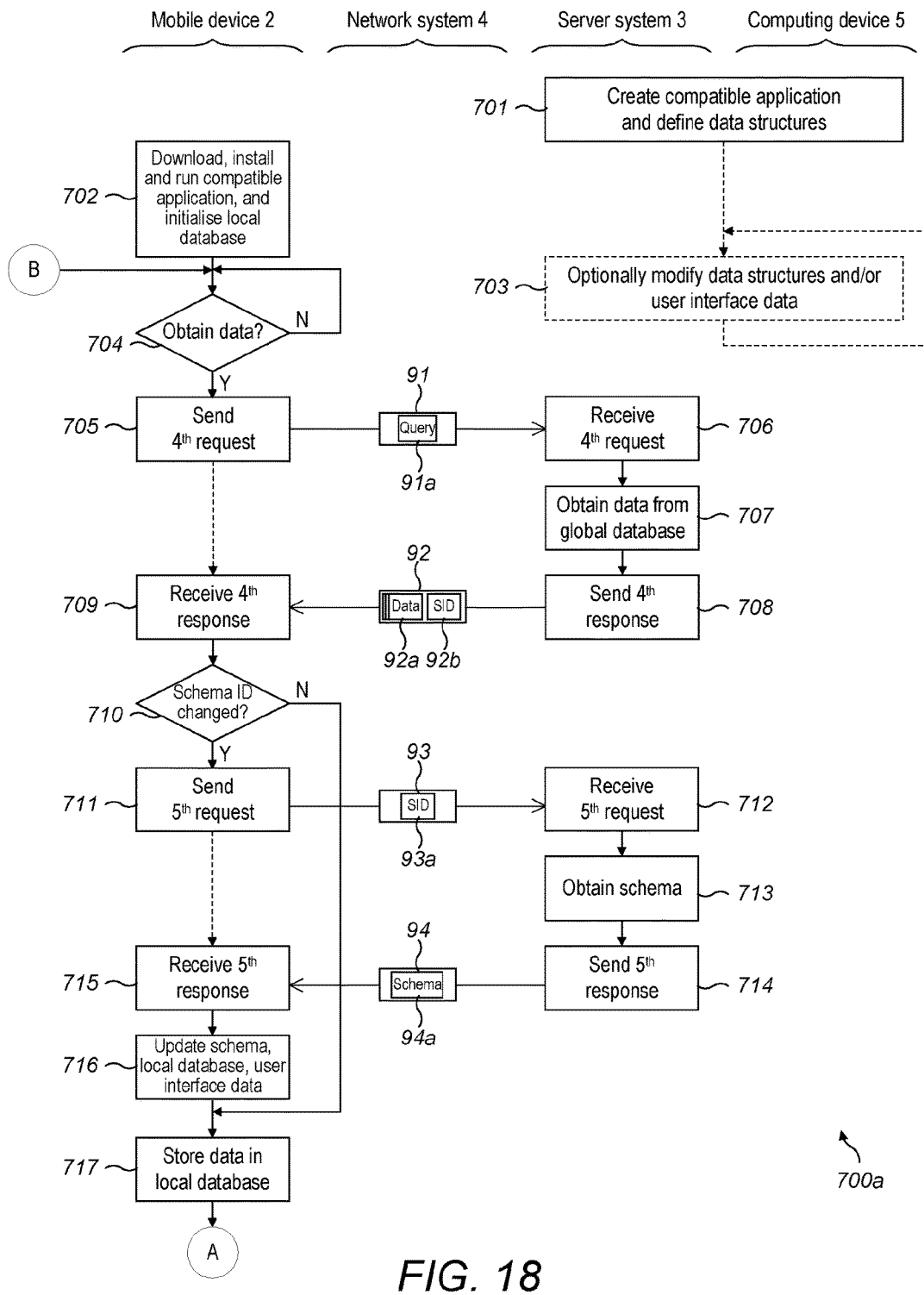
FIG. 18 illustrates a part of another method which can be performed by components of the system of FIG. 1.

Referring to FIG. 18, a part 700a of a method 700 (hereinafter referred to as the seventh method) will now be described.

At a first step 701, the server system 3 and a computing device 5 provides a developer interface which enables a developer to create a compatible application 15.

The developer interface also enables the developer to define a database model which will be used in relation to the compatible application 15. The database model defines entities, relationships between the entities, constraints, etc. For example, the database model may specify that a mobile user is uniquely identified by a user name, that certain types of data relating to the mobile user are required, optional, public, private, etc., that mobile users can have one of several types of relationship, etc.

The developer interface also enables the developer to define data 69 (FIG. 19) (hereinafter referred to as user interface data). As will be explained in more detail below, the mobile device 2 is configured to use the user interface data 69 to at least partly control how a type of data is to be outputted and/or inputted via the mobile user interface.

The creation of the compatible application 15 and the definition of the database model and the user interface data 69 may be performed in any suitable way.

Figure 19:
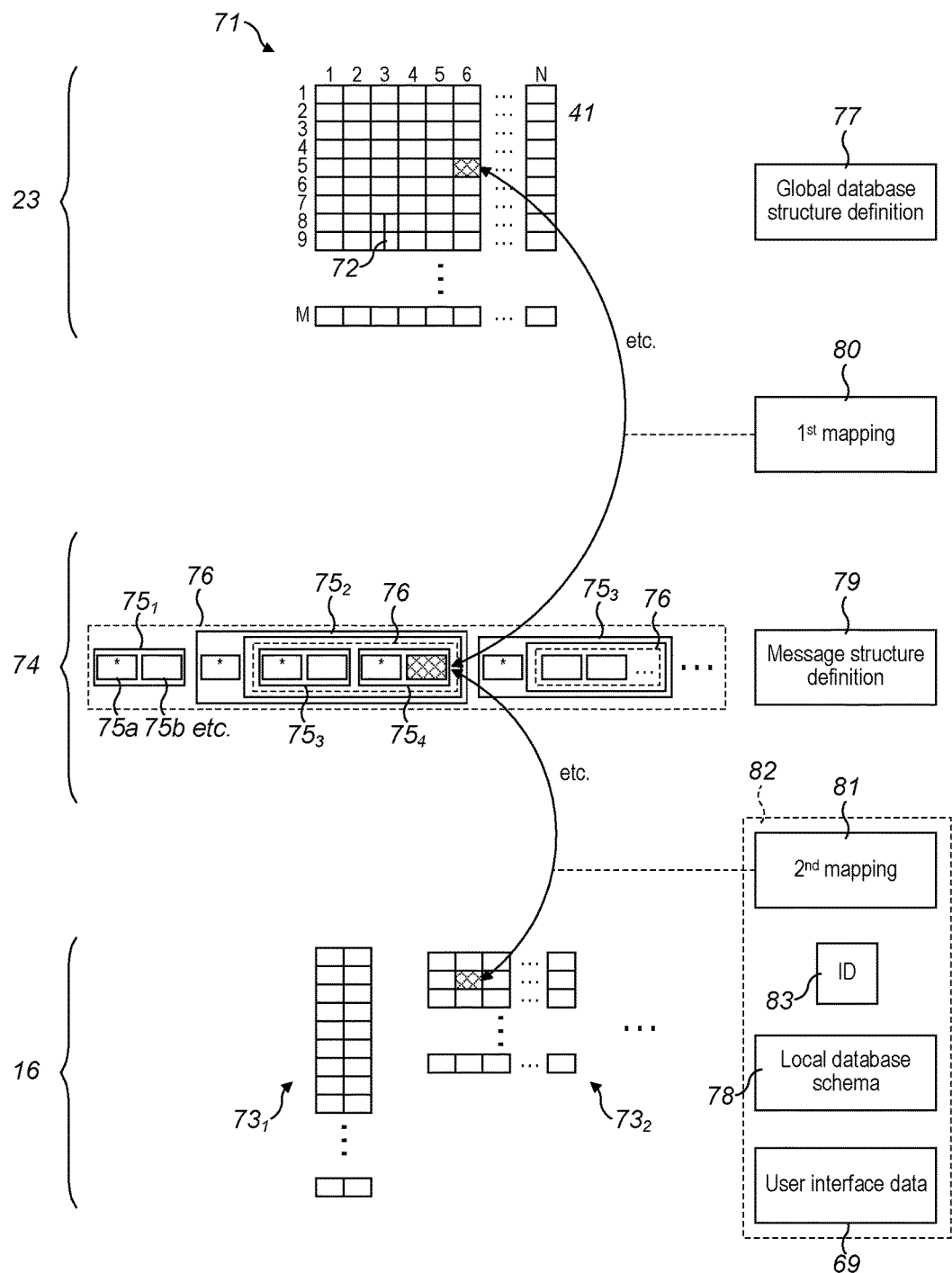
FIG. 19 illustrates data structures used in the method of FIG. 18.

Referring to FIG. 19, the server system 3 defines several data structures using the database model. In particular, the server system 3 defines a structure of (at least a part of) the global database 23, a structure of the local database 16 and a structure of data in messages 74 sent between the server system 3 and a mobile device 2.

The global database 23 preferably corresponds to a denormalised database so as to enable more efficient querying. In particular, the global database 23 preferably corresponds to a single table 71. Different rows of the table 71 can relate to different types of element (e.g. mobile users, records of conversations between mobile users, etc.). For each type of element, a row has a defined format to store some or all of the data values used by the system 1 for an element of this type. A cell of the table 71 can include several data values separated from one another by suitable delimiters 72.

The local database 16 preferably corresponds to a relational database, e.g. an SQL-based database. In particular, the local database 16 preferably includes several tables $73_1$, $73_2$ . . . . Each table 73 has an identifier (hereinafter referred to as a table name) and defined number of columns or, in other words, fields. Each column has an identifier (hereinafter referred to as a column name), a data type, and may have further constraints on the data values in the column (e.g. a maximum length). One or more of the columns in each table 73 corresponds to a primary key.

The local database 16 preferably includes a table 73 (hereinafter referred to as the user interface data table) including user interface data 69 associated with one or more fields in the local database 16.

The data in messages 74 sent between the server system 3 and a mobile device 2 is preferably formatted using name-value pairs 75. For example, the data may be formatted using JSON, as described e.g. in IETF RFC 7159. A message 74 may include a name-value pair 75 or an array 76 of name-value pairs $75_1, 75_2, 75_3, \ldots$, wherein each value 75b corresponds to a data value, another name-value pair 75, or an array 76 of data values and/or name-value pairs 75.

The server system 3 creates data 77, 78, 79 directly or indirectly defining the structure of the global database 23, the structure of the local database 16 and the structure of data in the messages 74. These data 77, 78, 79 are hereinafter referred to as the global database structure data, the message structure data and the local database schema, respectively. The server system 3 also creates data 80 (hereinafter referred to as first mapping data) directly or indirectly defining how data from the global database 23 is to be placed in a message 74 and vice versa. The server system 3 also creates data 81 (hereinafter referred to as second mapping data) directly or indirectly defining how data from a message 74 is to be included in the local database 16 and vice versa. The first and/or second mapping data 80, 81 may indirectly define the structure of data in the messages 74.

The local database schema 78, the second mapping data 81 and the user interface data 69 are hereinafter collectively referred to as the data handling schema 82. The data handling schema 82 has an identifier 83 (hereinafter referred to as a schema identifier), e.g. a version number.

The global database structure data 77 and the first mapping data 80 are used by the server system 3 when, for example, obtaining data from the global database 23 and including the data in a message 74 to a mobile device 2.

The local database schema 78 and the second mapping data 81 are used by the mobile device 2 when, for example, obtaining data from a message 74 from the server system 3 and including the data in the local database 16.

The data handling schema 82 is included with the compatible application 15. The data handling schema 82 is also stored by the server system 3, preferably in the global database 23.

Referring to FIG. 18, at a second step 702, at least one mobile device 2 downloads, installs and runs the compatible application 15 (including the data handling schema 82). This may be performed in any suitable way. As part of this step, the mobile device 2 may initialise the local database 16 according to the local database schema 78 and store the user interface data 69 in the local database 16, e.g. in the user interface data table 73.

At any time (at a third step 703), the developer may modify the database model and hence one or more of the global database structure data 77, the local database schema 78, the message structure data 79, the first mapping data 80 and the second mapping data 81. For example, the developer may want to add a particular entity to the database model and hence, for example, add an additional column to one of the tables 73 of the local database 16. Alternatively or additionally, the developer may modify the user interface data. As illustrated in the figure, these changes can be made after a mobile device 2 has downloaded the compatible application 15. In some examples, the changes can also be made by another user, e.g. an administrator.

When there is a change in the local database schema 78, the second mapping data 81 and/or the user interface data 69 (and hence the data handling schema 82) stored at the server system 3, the schema identifier 83 stored at the server system 3 is changed. For example, a version number may be increased.

At a fourth step 704, the mobile device 2 determines if data is to be obtained from the global database 23. Data may be obtained in various circumstances, e.g. in response to a call by another part of the compatible application 15, a user input, etc. If appropriate, then the seventh method 700 proceeds to a fifth step 705. If not, then the fourth step 704 is repeated.

At the fifth step 705, the mobile device 2 sends a request 91 of a fourth type (hereinafter referred to as a fourth request) to the server system 3. The fourth request 91 corresponds to a request for data (hereinafter referred to as requested data) from the global database 23. The fourth request 91 includes data 91a directly or indirectly specifying at least one requested type of data (hereinafter referred to as a requested field) and/or at least one requested (type of) element (hereinafter referred to as a requested record (type)) ('Query' in the figure). For example, the requested fields may be 'user name', 'description', 'status' and 'photoURL', etc. These fields may be specified directly or by specifying a name of a defined group of fields, e.g. 'profile'. The requested record type may be mobile users. The requested records may be mobile users in a vicinity of the current location of the mobile device 2.

At a sixth step 706, the server system 3 receives the fourth request 91.

At a seventh step 707, the server system 3 queries the global database 23 to obtain data corresponding to the requested data.

At an eighth step 708, the server system 3 sends a response 92 of a fourth type (hereinafter referred to as a fourth response) to the mobile device 2. The fourth response 92 includes data 92a corresponding to the data obtained at the seventh step 707. The data is included in the fourth response 92 according to the first mapping data 80. The fourth response 92 also includes data 92b ('SID' in the figure) corresponding to the schema identifier 83 associated with the current data handling schema 82. The fourth response 92 is preferably formatted as described above in relation to the message 74.

At a ninth step 709, the mobile device 2 receives the fourth response 92.

At a tenth step 710, the mobile device 2 determines if the schema identifier 83 included in the fourth response 92 is the same as the schema identifier 83 stored at the mobile device 2. The schema identifier 83 stored at the mobile device 2 may have been stored when the compatible application 15 was installed, or it may have been stored as part of a previously-performed sixteenth step 716 (described below). If the schema identifiers 83 are the same, then the data handling schema 82 stored at the mobile device 2 is suitable for handling the data included in the fourth response 92. In this case, the seventh method 700 proceeds to a seventeenth step 717 (described below). If not, then the data handling schema 82 requires updating. In this case, the seventh method 700 proceeds to an eleventh step 711.

At the eleventh step 711, the mobile device 2 sends a request 93 of a fifth type (hereinafter referred to as a fifth request) to the server system 3. The fifth request 93 corresponds to a request for a data handling schema 82 (hereinafter referred to as the updated data handling schema 82) associated with the schema identifier 83 included in the fourth response 92. The fifth request 93 includes data 93a corresponding to this schema identifier 83.

At a twelfth step 712, the server system 3 receives the fifth request 93.

At a thirteenth step 713, the server system 3 obtains the updated data handling schema 82, preferably from the global database 23.

At a fourteenth step 714, the server system 3 sends a response 94 of a fifth type (hereinafter referred to as a fifth response) to the mobile device 2. The fifth response 94 includes data 94a corresponding to the updated data handling schema 82 ('Schema' in the figure). In some examples, the data 94a included in the fifth response 94 corresponds to the complete updated data handling schema 82. In other examples, the data 94a corresponds to changes relative to e.g. a previous version or a core version of the data handling schema 82. The fifth response 94 is preferably formatted as described above in relation to the message 74.

At a fifteenth step 715, the mobile device 2 receives the fifth response 94.

At a sixteenth step 716, the mobile device 2 updates the data handling schema 82 stored at the mobile device 2 using data from the fifth response 94. As a part of this, the mobile device 2 also updates the schema identifier 83 stored at the mobile device 2.

If the local database schema 78 has been updated, then the mobile device 2 restructures the local database 16 according to the updated local database schema 78. For example, the mobile device 2 may add a new column to a table 73, etc.

If the user interface data 69 has been updated, then the mobile device 2 stores the updated user interface data 69 in the (restructured) local database 16 in the user interface data table 73.

At a seventeenth step 717, the mobile device 2 stores the data in the fourth response 92 in the (restructured) local database 16. The mobile device 2 obtains the data from the fourth response 92 and includes it in the local database 16 according to the (updated) second mapping data 81. For example, the second mapping data 81 may specify a correspondence between a name used in a name-value pair 75 in the fourth response 92 and a column name of a new column added to a table 73 of the local database 16.

Thus, the database model associated with the compatible application 15 can be changed and the mobile device 2 can still function correctly without having to update the compatible application 15. Moreover, the server system 3 can send data to mobile devices $2_1 \ldots 2_N$ without prior knowledge of the structure of their local databases 16.

Figure 20:
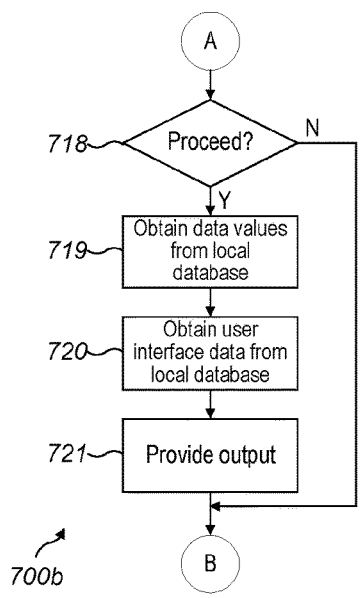
FIG. 20 illustrates another part of the method of FIG. 18.

The seventh method 700 then proceeds to an eighteenth step 718 (FIG. 20).

Referring to FIG. 20, another part 700b of the seventh method 700 will now be described.

At the eighteenth step 718, the mobile device 2 determines if the seventh method 700 is to proceed with providing an output in relation to data (hereinafter referred to as relevant data) in the local database 16. The seventh method 700 may proceed in response to a call by another part of the compatible application 15, a user input, etc. If appropriate, the seventh method 700 proceeds to a nineteenth step 719. If not, then the eighteenth step 718 is repeated.

At the nineteenth step 719, the mobile device 2 obtains the relevant data from the local database 16.

At a twentieth step 720, the mobile device 2 obtains, from the local database 16, any user interface data 69 associated with each field from which the relevant data was obtained at the nineteenth step 719.

At a twenty-first step 721, the mobile device 2 provides an output via the mobile user interface in relation to the relevant data.

Figures 21A, 21B, 21C:
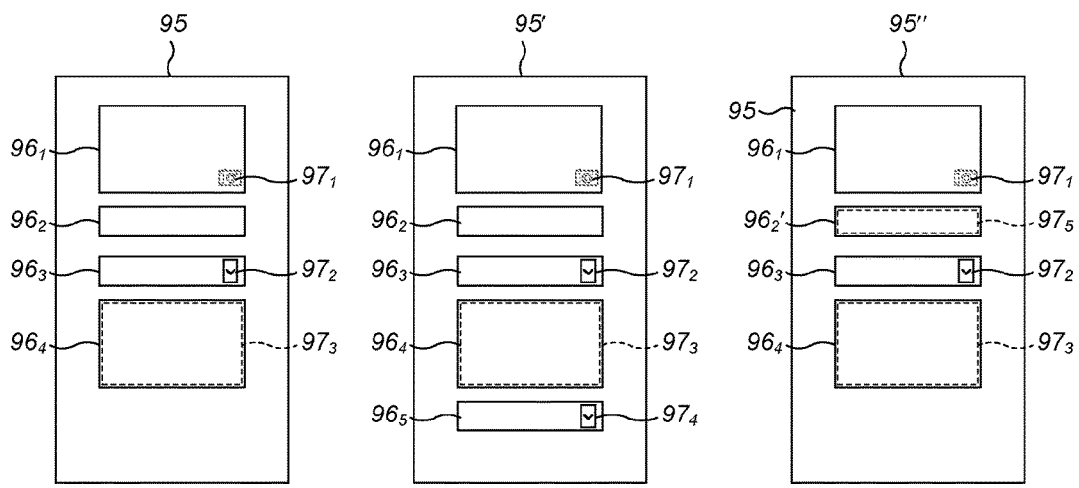
FIG. 21A illustrates an output provided by a mobile device at a step of the method of FIG. 20.
FIG. 21B illustrates another output provided by a mobile device at a step of the method of FIG. 20.
FIG. 21c illustrates another output provided by a mobile device at a step of the method of FIG. 20.

Referring to FIG. 21A, an output 95 (hereinafter referred to as the first output) provided by the mobile device 2 as part of the twenty-first step 721 will now be described.

The first output 95 includes several interface elements 96. Each interface element 96 may include a part (hereinafter referred to as an output element) representing relevant data. In the example illustrated in the figure, the relevant data is from a defined group of fields (named 'profile'). The group of fields includes the fields 'user name', 'description', 'status' and 'photoURL'. The interface elements 96 include a first interface element $96_1$ including a photograph obtained using the value of the 'photoURL' field, a second interface element $96_2$ including the value of the 'username' field, a third interface element $96_3$ including the value of the 'status' field, and a fourth interface element $96_4$ including the value of the 'description' field.

Each interface element 96 may include a part 97 (hereinafter referred to as an input element) with which the mobile user can interact in order to (start to) provide data to be stored in the local database 16. In the example illustrated in the figure, the relevant data is from the record relating to the mobile user. Hence some of the relevant data can be edited. In the example illustrated in the figure, the first interface element $96_1$ includes an input element $97_1$ to enable the mobile user to change the photograph e.g. by taking a new photograph or selecting an existing photograph, the third interface element $96_3$ includes an input element $97_2$ to enable the mobile user to select from a drop-down list of predetermined statuses, and the fourth interface element $96_4$ includes an input element $97_3$ to enable the mobile user to edit the description.

The configuration of some or all of the interface elements 96 is at least partly determined by the user interface data 69 for the field associated the interface element 96. The user interface data 69 preferably specifies one of a set of different types of interface element 96. The different types of interface element 96 may include, for example, a window, text box, button, drop-down list, list box, check box, radio button, cycle button, slider, etc. Each interface element has an identifier. The compatible application 15 preferably includes instructions to enable the mobile device 2 to provide each of the different types of interface element 96.

Certain aspects of the configuration of the interface element 96 may be determined by the compatible application 15. For example, the compatible application 15 may determine the placement of the interface element 96, details of the appearance (e.g. colour) of the interface element 96, etc.

Referring to FIG. 21B, another output 95' (hereinafter referred to as the second output) provided by the mobile device 2 as part of the twenty-first step 721 will now be described. The second output 95' may have been provided by the mobile device 2 in the same circumstances as the first output 95, e.g. in response to the same call, the same user input, etc. However, the local database 16 has been restructured as described above between the times at which the first output 95 and the second output 95' were provided. In particular, an additional field, e.g. a 'gender' field, has been added by the developer to the 'profile' group of fields. Hence, for example, a 'gender' column has been added to a 'profile' table 73 in the local database 16, and user interface data 69 associated with the 'gender' column has been added to the user interface data table 73 in the local database 16. Accordingly, when caused to output data relating to the 'profile' group of fields, the mobile device 2 outputs the interface elements 96 described above with reference to FIG. 21A and an additional, fifth interface element $96_5$ including, for example, an input element 97₄ to enable the mobile user to select from a suitable drop-down list.

Referring to FIG. 21C, another output 95" (hereinafter referred to as the third output) provided by the mobile device 2 as part of the twenty-first step 721 will now be described. The third output 95" may have been provided by the mobile device 2 in the same circumstances as the first output 95. However, the user interface data 69 in the local database 16 has been updated as described above between the times at which the first output 95 and the third output 95" were provided. In particular, the second interface element 96₂' including the value of the 'username' field has been updated by the developer to include an input element 97₅ to enable the mobile user to edit the username. Hence, for example, the user interface data 69 corresponding to the 'username' field has been updated accordingly in the local database 16.

Thus, the configuration and functions of the mobile user interface provided by the mobile device 2 can be changed without updating the compatible application 15.

Modifications

It will be appreciated that many other modifications may be made to the embodiments hereinbefore described.

For example, the system 1 may provide relevant services other than location-based social networking services. For example the relevant services need not be location-based and/or need not provide a social networking service.

The mobile devices 2₁ ... 2_N may correspond to different types of computing devices.

The global database 23 and/or the local database 16 may correspond to different type of database.

In the seventh method 700, instead of the server system 3 sending a message 74 including data to the mobile device 2, the mobile device 2 may send a message including data to the server system 3. The mobile device 2 includes the data in the message 74 according to a data handling schema 82. The server system 3 may specify a data handling schema 82 in a request for the data and, if necessary, the mobile device 2 may update the data handling schema 82 before sending the message 74.

The invention claimed is:

1. A method of operating a server, the method comprising:
receiving a request for data associated with a particular number of elements in a vicinity of a location;
simultaneously searching a data structure for a plurality of geohashes at a first level to find a first set of a first number of elements;
selectively simultaneously searching the data structure for a plurality of geohashes at a second level to find a second set of a second number of elements, wherein the second level is determined based upon a comparison between the first number and the particular number wherein, if the first number is less than the particular number, then the second level is higher than the first level, wherein a geohash at a higher level corresponds to a larger geographical area; and
providing a response including data associated with the first set of elements and, if found, the second set of elements.

2. The method according to claim 1, wherein the plurality of geohashes corresponds to a first geohash that includes the geographical location and the eight nearest geohashes to the first geohash.

3. The method according to claim 1, comprising:
in response to determining that the first number is sufficiently close to the particular number, refraining from searching the data structure for the plurality of geohashes at the second level.

4. The method according to claim 1, wherein the difference between the second level and the first level is an increasing function of the magnitude of the difference between the particular number and the first number.

5. The method according to 1, comprising:
in response to determining that the second number exceeds the particular number, providing the response.

6. The method according to claim 1, comprising:
selectively simultaneously searching the data structure for a plurality of geohashes at a third level to find a third set of a third number of elements, wherein the third level is determined based upon a comparison between the second number and the particular number.

7. The method according to claim 1, wherein the data structure is geohash-indexed.

8. The method according to 1, comprising:
receiving data specifying a location of an element; determining a set of geohashes corresponding to the location of the element; and including the set of geohashes in the data structure.

9. The method according to claim 1, wherein the requested data comprises data specifying a location associated with each of the elements.

10. Apparatus comprising:
at least one processor; and
at least one memory including computer program code;
the at least one memory and the computer-readable instructions configured to, with the at least one processor, cause the apparatus to perform a method comprising:
receiving a request for data associated with a particular number of elements in a vicinity of a location;
simultaneously searching a data structure for a plurality of geohashes at a first level to find a first set of a first number of elements;
selectively simultaneously searching the data structure for a plurality of geohashes at a second level to find a second set of a second number of elements, wherein the second level is determined based upon a comparison between the first number and the particular number; and
providing a response including data associated with the first set of elements and, if found, the second set of elements.

11. A system comprising:
at least one network;
a server system comprising apparatus according to claim 10; and
a mobile device connectable to the server system via the at least one network and configured to send the request to the server system and receive the response from the server system.

* * * * *